(12) United States Patent
Mohammed Suhura et al.

(10) Patent No.: US 9,831,716 B2
(45) Date of Patent: Nov. 28, 2017

(54) INTUITIVE ELECTRONIC CIRCUIT

(71) Applicant: Shailendra Kumar Suman, Matthews, NC (US)

(72) Inventors: Shanavas Mohammed Suhura, Bangalore (IN); Subramanian Shridhar, Thiruvarur District (IN); Sunay Narkar, Bangalore (IN); Dattatraya Chandrakant Bathe, Bangalore (IN); Senthil Kumar Panchanathan, Trichy (IN); Kuberasampath Subramaniam, Coimbatore District (IN)

( * ) Notice: Subject to any disclaimer, the term of this patent is extended or adjusted under 35 U.S.C. 154(b) by 488 days.

(21) Appl. No.: 14/531,985

(22) Filed: Nov. 3, 2014

(65) Prior Publication Data
US 2015/0054338 A1 Feb. 26, 2015

Related U.S. Application Data

(62) Division of application No. 13/000,940, filed on Dec. 22, 2010, now Pat. No. 8,907,523.

(30) Foreign Application Priority Data
Dec. 8, 2008 (IN) .......................... 3087/CHE/2008

(51) Int. Cl.
*H02J 7/00* (2006.01)
*H02J 9/00* (2006.01)
*H02J 9/06* (2006.01)
*H02J 9/02* (2006.01)

(52) U.S. Cl.
CPC ................. *H02J 9/061* (2013.01); *H02J 9/02* (2013.01); *Y10T 307/344* (2015.04)

(58) Field of Classification Search
CPC ............ H05B 33/0854; H05B 37/0263; H05B 33/0842; H05B 33/0803; H05B 37/02; H05B 37/029; H05B 37/038; H05B 37/034; H05B 41/2853; H02J 9/02; H02J 9/065; H02J 9/00; H02J 9/061; F21S 9/022
USPC ......................................................... 307/66
See application file for complete search history.

(56) References Cited

U.S. PATENT DOCUMENTS

| 4,323,820 | A | 4/1982 | Teich |
| 7,481,546 | B2 | 1/2009 | Nielson et al. |
| 2003/0141819 | A1 | 7/2003 | Cojocary |
| 2013/0285558 | A1* | 10/2013 | Recker ...................... H02J 9/02 315/153 |

FOREIGN PATENT DOCUMENTS

| GB | 2208192 A | 8/1989 |
| JP | 2006288049 A | 10/2006 |

* cited by examiner

*Primary Examiner* — Carlos Amaya
(74) *Attorney, Agent, or Firm* — Geoffrey Gelman

(57) ABSTRACT

An apparatus according to various embodiments may detect the state of an external switch. An apparatus according to various embodiments may activate or deactivate an appliance based on the state of the external switch. An apparatus according to various embodiments may activate or deactivate an appliance based on the state of the external switch, even in the absence of grid power.

1 Claim, 19 Drawing Sheets

INTUITIVE ELECTRONIC CIRCUIT

RELATED APPLICATIONS

The present application claims the benefit of priority of U.S. patent application Ser. No. 13/000,940, entitled, "Intuitive Electronic Circuit", and filed Dec. 22, 2010, the entirety of which is incorporated by reference herein for all purposes.

BACKGROUND

In some situations, detecting the state of a switch may be useful. In some situations, it may be useful to detect the state of a switch even in the absence of grid power.

SUMMARY

An apparatus according to some embodiments may determine the state of an external switch. An apparatus according to some embodiments may determine the state of an external switch even in the absence of grid power. An apparatus according to some embodiments may activate an appliance.

DETAILED DESCRIPTION

Figure 1:
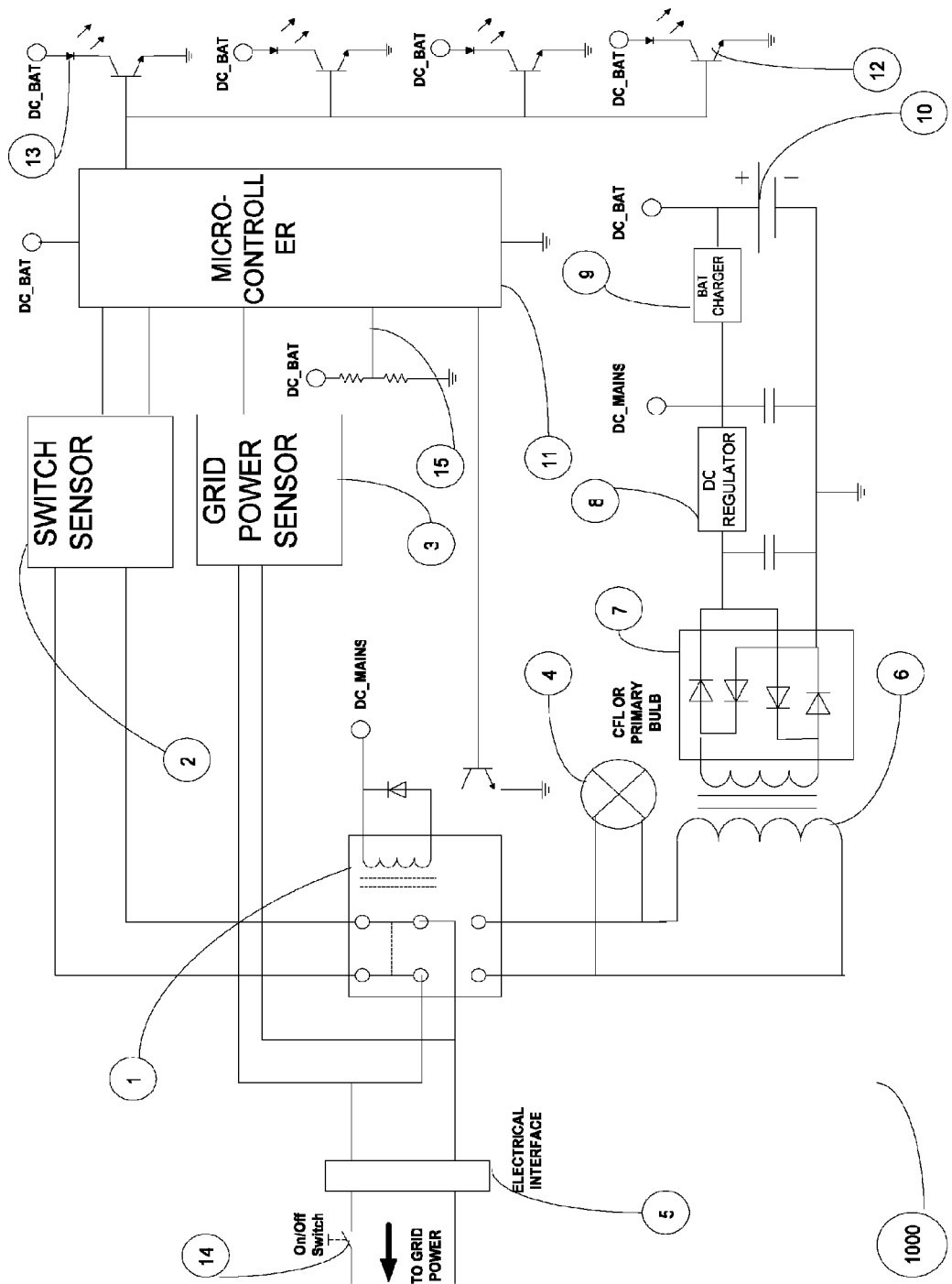
FIG. 1 illustrates a circuit according to some embodiments.

An apparatus according to various embodiments may include a light or other appliance that can function in the absence of a primary source of power. The primary source of power may include a public or private power grid, a generator, an engine, a building circuit, an office circuit, a factory circuit, a home circuit, a circuit, a battery, or any other source of power. For example, an incandescent light may derive its primary source of power from a public power grid. However, according to various embodiments, the light may be designed to operate (e.g., to emit light) even in the absence of the primary source of power, such as when there is a general power outage. As another example, a light in a car may derive its primary source of power from the car battery. However, the light may be designed to operate even if the main car battery is no longer supplying power.

An apparatus according to various embodiments may include a secondary source of power. The secondary source of power may include a battery, fuel cell, ultra-capacitor, or any other store of power or energy, as will be appreciated. The secondary power source may or may not use the same technology or mode of power generation as the primary power source. As will be appreciated, an apparatus according to various embodiments may include a plurality of secondary power sources, which may or may not employ the same technology.

An apparatus according to various embodiments may include a primary appliance and a secondary appliance. The secondary appliance may be functionally similar to the primary appliance, in some embodiments. For example the primary appliance may be a first light and the secondary appliance may be a second light. In some embodiments, the secondary appliance may draw or consume less power than the primary appliance. For example, a primary appliance may be an incandescent light bulb, while a secondary appliance may be a light-emitting diode. The secondary appliance may consume less power than the primary appliance because, e.g., the secondary appliance may be intended for use with the secondary power source, which may supply less power than does the primary power source.

An apparatus according to various embodiments may include a primary light source and a secondary light source. The primary light source may include an incandescent light, a fluorescent light, a compact fluorescent light, or any other light, or any combination thereof. In some embodiments, the secondary light source may be a Light Emitting Diode (LED). In some embodiments, the secondary light source may include multiple LEDs. In some embodiments, the secondary light source may include four LEDs. In some embodiments, the secondary light source may include an incandescent light, a fluorescent light, an organic light emitting diode, or any other light source, or any combination thereof.

An apparatus according to various embodiments may include a single light source. The apparatus may use the single light source either in conjunction with the primary power source, or the secondary power source, as circumstances may dictate.

An apparatus according to various embodiments may draw power from the primary power source so long as the primary power source supplies power. For example, an apparatus may draw power from an electrical grid or main circuit so long as there is power in the grid. In some embodiments, the apparatus may draw power from the secondary power source if the primary power source ceases to supply power. In some embodiments, the apparatus may draw power from the secondary power source if the primary power source ceases to provide power at an appropriate level, at a safe level, at a usable level, at a consistent level, or according to any other predetermined criteria, or according to any other criteria.

An apparatus according to some embodiments may draw power from the secondary power source when it ceases drawing power from the primary power source. In some embodiments, upon ceasing to draw power from the primary power source, the apparatus may disconnect the appliance from the primary power source. In this way, for example, the apparatus may protect one or more components (e.g., circuit elements) from any harmful power spikes or other problems associated with a restoration (e.g., a sudden restoration) of power in the primary power source.

An apparatus according to some embodiments may activate the secondary appliance once the apparatus has ceased to draw power from the primary power source. An apparatus according to some embodiments may activate a secondary light source once the apparatus has ceased to draw power from the primary power source. An apparatus according to some embodiments may connect the secondary power source to the primary light source when the primary power source has ceased to supply power. For example, in some embodiments, an apparatus may include only a single light source, which may be connected either to the primary power source if it is supplying power, or to the secondary power source if the primary power source is not supplying power.

An apparatus according to some embodiments may deactivate the secondary light source once power from the primary power source has been restored. An apparatus according to some embodiments may reconnect an appliance (e.g., a light) from the secondary power source to the primary power source once the power of the primary power source has been restored.

In some embodiments, a secondary appliance (e.g., a secondary light source) may remain connected to a secondary power source (e.g., to a battery) regardless of whether or not power is available in the primary power source. The secondary appliance may therefore, in some instances function even while the primary appliance is functioning. For example, the secondary light may be on while the primary light is on. Any duplicated function, however, may be tolerable, in some embodiments. For instance, compared to a primary light source that is an incandescent bulb, a secondary light source that is a light-emitting diode may be hardly noticeable. In some embodiments, once a primary appliance is activated, a secondary appliance is deactivated (e.g., by microcontroller 11).

An apparatus according to some embodiments may connect the secondary power source to the primary power source when the primary power source is supplying power. For example, the apparatus may connect a component battery to the power grid so as to charge the battery when the power grid is supplying power. In this way, the secondary power source may store the maximum amount of power possible for the next time that power is lost from the primary power source.

Power Detection

An apparatus according to some embodiments may include a sensor, sensing means, or other detector for detecting a power level from the primary source of power. The sensor may detect, for example, a voltage level, a current level, an amplitude level, a frequency, or any other indicator of a power level in the primary source of power.

In some embodiments, based on the detected power level, the apparatus may exhibit one or more responses. Responses may include disconnecting or disengaging one or more components or circuit elements from the primary power source. Disengaging or disconnecting may include breaking or removing an electrically conducting pathway (e.g., a pathway connecting the primary power source to a component or circuit element, such as a light source or battery). Disconnecting or disengaging may include opening a relay or switch. Responses may include reengaging or reconnecting one or more circuit elements to the primary power source. Reengaging or reconnecting may include closing a relay or switch. Responses may include activating a secondary power source, such as a secondary light (e.g., an LED). Responses may include disengaging or disconnecting the secondary power source from one or more components or circuit elements. For example, when power is restored in the primary power source following an outage, a secondary light source that had been connected to the secondary power source may now be disconnected. Responses may include engaging or connecting the secondary power source to one or more circuit elements.

Various responses to a detected change in power level may include polling or testing an external circuit.

Detection of State of External Circuit

An apparatus according to various embodiments may be attached or attachable to an external circuit. The apparatus may connect to the external circuit via an electrical interface. For example, the apparatus may include two electrical contacts via which an electric current may flow in and out, or out and in. The electrical interface may take various physical forms. For example, the apparatus may include a light bulb, where the electrical interface comprises a first electrical contact at the base of the light bulb and a second electrical contact in the form of a cylindrical sheath with a spiraling ridge near the base of the light bulb. The second electrical contact may allow the light bulb to screw into a socket, for example. As will be appreciated, according to various embodiments, the electrical interface may take the form of a plug with prongs, or may take any other form.

According to various embodiments, the external circuit may include a general home circuit, a general building circuit, a general circuit in an airplane, a general circuit in a car, bus, or other vehicle, or any general circuit. The external circuit may include a circuit that powers one or more appliances, such as a refrigerator, fan, toaster, microwave, oven, light, television, hair dryer, computer, telephone, sound system, speaker system, security system, sprinkler system, bread machine, freezer, vacuum cleaner, air purifier, water cooler, radio, heater, air conditioner, etc. The appliances may constitute "loads" on the circuit. The external circuit may, in turn, interface with a power grid, such as an electrical grid connected to a utility company. As will be appreciated, the external circuit may also interface with a generator or any other source of electrical power.

The external circuit may include a switch, button or other control or other device for activating or deactivating an apparatus according to various embodiments. For example, an apparatus according to various embodiments may include a light bulb. The switch may be designed to control the light bulb. For instance, when the switch is placed in a first state (e.g., in an "on" state), the intention is for the light to go on (e.g., to emit light). When the switch is placed in a second state (e.g., in an "off" state), the intention is for the light to go off (e.g., to not emit light).

In some embodiments, the switch may operate by creating a break or a connection within the external circuit. For example, when placed in an "off" state, the switch may interrupt or prevent the flow of power or electricity to the apparatus, according to some embodiments. When placed in an "on" state, the switch may allow for power or electricity to flow to the apparatus according to various embodiments.

An apparatus according to various embodiments may be designed to operate when a primary power source (e.g., an electrical power grid) is not supplying power (e.g., there is a power outage), but when the switch controlling the apparatus is in an "on" state or other state indicative of a user or operator's desire to have the apparatus function. According to various embodiments, the apparatus would not operate (e.g., would not emit light) when the switch controlling the apparatus is in an "off" state or other state indicative of a user or operator's desire to have the apparatus not function.

An apparatus according to various embodiments has the ability to perform a particular function (e.g., to emit light) when the primary power source is not supplying power (or adequate power), but has the ability to cease its operations (e.g., to cease or avoid emitting light) when the switch controlling the apparatus is in a particular state (e.g., in an "off" state).

An apparatus according to various embodiments may be capable of distinguishing two scenarios, namely: (1) the apparatus does not receive power from the primary power source because the primary power source itself is not supplying power (e.g., there is a power outage); and (2) the apparatus does not receive power from the primary power source because the switch controlling the apparatus is in a state that disconnects the apparatus from the primary power source. In the first scenario, the apparatus may be designed to function (e.g., to emit light), while in the second scenario, the apparatus may be designed to cease or refrain from functioning (e.g., to avoid emitting light).

An apparatus according to various embodiments may be capable of distinguishing states of a switch on an external circuit even when no power is supplied to the external circuit. For example, the apparatus may be able to tell whether a switch in a home circuit or building circuit is on or off even when there is a power outage and there is no power available or flowing through the home or building circuit.

An apparatus according to various embodiments may incorporate an emergency or mission critical functionality. For instance, the apparatus may be capable of function or operation even during a general power outage. When a primary source of power is not available, the apparatus may operate using a secondary source of power, such as a component battery. The secondary source of power may have a limited lifetime, however. Thus, it may be desirable to conserve power from the secondary source of power. Accordingly, an apparatus according to various embodiments may limit its function or operation only to those times when a switch or other control on an external circuit indicates that the apparatus should be operational. In this way, for example, if the apparatus is not needed (e.g., if the apparatus is not needed as a light source), the apparatus may cease or refrain from functioning, and may thereby conserve power within the secondary power source.

An apparatus according to various embodiments may test or poll the external circuit. The apparatus may poll the circuit to determine the state of a switch designed to control the apparatus. Polling the external circuit may include transmitting an electric signal (e.g. a current; e.g., a voltage) into the external circuit via the interface of the apparatus to the external circuit. The electric signal may constitute a reference signal. If the switch controlling the apparatus is in an "on" state, the electric signal may flow through one or more of the loads attached to the external circuit. For example, the electric signal may flow through a wall clock that is also attached to the external circuit. The electric signal may then flow back to the apparatus, possibly having been modified or altered based on the path taken through the external circuit and through one or more loads attached thereto. The electric signal received may be detected, analyzed, and/or compared to the reference signal in order to determine whether or not the switch is "on". If the returning signal meets one or more criteria (e.g., if any returning signal is detected), then it may be determined that the switch is in an "on" state. Accordingly, the apparatus may initiate or maintain operation. The apparatus may, for example, initiate or continue to draw power from the secondary power source. If the switch controlling the apparatus is in an "off" state, then the electric signal may not flow at all. For instance there may be no return signal detected. Accordingly, the apparatus may cease operation or may refrain from operation (e.g., the apparatus may keep all light sources off).

An apparatus according to various embodiments may include a sensor, detector, or other means to determine whether power is available from the primary power source. Power may be available, for example, if the grid power is on and if a switch controlling the apparatus is in an "on" state. In some embodiments, the detector may receive current from the primary power source, No Augmentation to External Circuit An apparatus according to various embodiments may detect the state of a switch in an external circuit (e.g., a circuit to which the apparatus is attached via an electrical interface), even in the absence of any modification or augmentation to the external circuit. An apparatus according to various embodiments is self-contained within a single housing. An apparatus according to various embodiments is contained within a single rigid housing. An apparatus according to various embodiments is contained within a single form factor. An apparatus according to various embodiments may be electrically coupled to an external circuit via a single electrical interface. An apparatus according to various embodiments may be electrically coupled to an external circuit via exactly two electrical contacts. An apparatus according to various embodiments may be electrically coupled to an external circuit via exactly three electrical contacts. An apparatus according to various embodiments may be electrically coupled to an external circuit via a light bulb socket. In other words, an apparatus according to various embodiments may be screwed into a light bulb socket. An apparatus according to various embodiments may be inserted into a fixture or attachment designed for a light bulb. An apparatus according to various embodiments may be inserted into a fixture or attachment designed for a light, such as for a fluorescent light or for any other light. An apparatus according to various embodiments may become fully functional or fully capable of functioning, including fully capable of detecting the state of an external switch solely after being coupled to the external circuit via a single electrical interface.

An apparatus according to various embodiments may be completely contained and embodied on a single side of a switch in an external circuit. For example, an apparatus according to various embodiments may have all of its components on one side of a switch contained in an electrical circuit, and may have none of its components contained on the other side of the switch. Thus, to detect a closed switch (e.g., an "on" switch), an apparatus according to various embodiments may send an electrical signal through the switch, and then through other appliances on the external circuit. The apparatus need not rely, in various embodiments, on a secondary component of the apparatus that is on the other side of the switch in order to complete a circuit incorporating the switch. In this way, according to various embodiments, the apparatus may function without the necessity of modifications to the external circuit. Thus, various embodiments may avoid the necessity of costly, dangerous, or illegal modifications to the external circuit in order for the apparatus to function. In various embodiments, the apparatus may be fully functional solely after being plugged in or otherwise inserted at a single location.

Grid Power

As used herein, a general power supply received in home, office, building, factory, etc., may be referred to as "mains power", "household power", "household electricity", "powerline", "domestic power", "wall power", "line power", "AC power", "city power", "grid power", or "hydro". The power may be delivered or received via outlets or electrical interfaces with two or three wired contacts. A "line wire", also called a "live wire", "phase contact", "hot contact" or "active contact" may carry current (e.g., alternating current) from the power grid, while the "neutral" line may complete the circuit back to the power grid. An "earth" wire or "ground" may connect to ground as a safeguard against insulation failures.

FIG. 1 illustrates a circuit 1000 according to various embodiments. The circuit may function to supply or direct power to a primary appliance (e.g., a first light source) if a primary power source is supplying power and an external switch is on. The circuit may function to supply or direct power from a secondary power source (e.g., from a battery) to a secondary appliance (e.g., to a second light source) if a primary power source is not supplying power but the external switch is on. If the external switch is off, the circuit may function to maintain all appliances (e.g., both the first and second light sources) in an off or non-functional state. In some embodiments, the circuit 1000 may connect or disconnect certain components of the circuit to an external circuit based on whether or not power is received from the external circuit, and/or based on whether the external switch is on or off.

Circuit 1000 may include a microcontroller 11 which may carry out various logical operations. According to various embodiments, microcontroller may dictate or otherwise direct the operations of other components of circuit 1000. Microcontroller 11 may receive one or more input signals from one or more other components, and may determine or otherwise arrive at one or more output signals for transmission to one or more other components. Input signals may take the form of particular voltage levels, current levels, time varying voltage or current levels, or any other form, as will be appreciated. Microcontroller 11 may be a logic circuit, in various embodiments. Microcontroller 11 may be a silicon based integrated circuit, in various embodiments. Microcontroller 11 may be made from a series of standard or non-standard electrical components, including resistors, capacitors, inductors, diodes, transistors, relays, or any other electrical components, as will be appreciated.

According to various embodiments, circuit 1000 may further include a relay 1, a primary light source 4 (e.g., an incandescent light bulb), a step down transformer 6, a full-wave rectifier 7, a direct current regulator 8, a battery charger 9, a secondary power source 10 (e.g., a battery), a secondary light source (e.g., one or more light-emitting diodes 13), and one or more transistors 12.

According to various embodiments, circuit 1000 may include a switch sensor 2, which may be operable to detect and/or to assist in the detection of the state of a switch on an external circuit. According to various embodiments, circuit 1000 may include a grid power sensor 3 which may be operable to detect when power is being received at circuit 1000 via the primary power source (e.g., via an external circuit; e.g., via an external home circuit).

According to various embodiments, microcontroller 11 may be electrically coupled to the battery 10. For example, a voltage output by the battery 11 may flow through a voltage divider, whereby at an input node 15, microcontroller may detect the resultant voltage (e.g., after the voltage output by the battery has been reduced across one resistive element). If the voltage detected at input node 15 falls within a first range (e.g., is above a certain level), then microcontroller 15 may allow circuit 1000 to carry out its normal function. However, if the voltage detected at input node 15 falls within a second range (e.g., is below a certain level), then microcontroller 15 may stop operation of circuit 1000. In stopping the operation of circuit 1000, the microcontroller may, for example, cause the cessation of power delivery to one or more components (e.g., to secondary light source 13). In stopping the operation of circuit 1000, the microcontroller may, for example, connect or disconnect one or more circuit components to an external circuit or to one or more other circuit components. For example, microcontroller 11 may cause relay 1 to couple or decouple one or more components. In various embodiments, microcontroller may detect any one of a number of charge levels in battery 10, and may cause circuit to enter into different modes of operation based on the charge level of battery 10. For instance, the microcontroller may be operable to detect any one of four different charge levels for battery 10, and may transmit different commands, signals, or instructions to other parts of circuit 1000 based on the charge level of battery 10.

Circuit 1000 may be connected to an external circuit (e.g., to a home or building circuit) via an electrical interface 5. The electrical interface may include one or more metallic or conducting contact points (e.g., two metallic contact points). The metallic conducting points may allow current to enter and exit circuit 1000, for example. An electrical connection of circuit 1000 to an external circuit may be effected by plugging an apparatus comprising circuit 1000 into a bulb socket, power outlet, or any other interface to the external circuit.

In various embodiments, the external circuit may include a switch 14, which may be a manual light switch, a button, or any other controller. The switch 14 may be operable to enable or interrupt the flow of current or power to the circuit 1000 depending on the configuration of the switch. For instance, the switch may be in an "on" or "closed" state, in which case the flow of current to circuit 1000 may be enabled. Alternatively, the switch may be in an "off" or "open" state, in which case the flow of current to circuit 1000 may be impeded or disabled. As will be appreciated, in various embodiments, switch 14 may include more than two states. For instance, switch 14 may include states where the flow of current is partially impeded or partially enabled. In various embodiments, switch 14 may include a mechanical component that can be manipulated by a human being in order to set or to effect the state of the switch. For example, a human being may be able to physically flip the switch in order to change its state from "on" to "off" or vice versa. In various embodiments, switch 14 may comprise two or more switches. The switches may, in aggregate, set a collective state for switch 14. For example, all component switches must be "on" in order for current flow to be enabled to circuit 1000, and thus for the collective state of the switch 14 to be "on".

In various embodiments, when switch 14 is in an "on" state, grid power at 230V or 220V V and 50 Hz is allowed to flow to circuit 1000. In various embodiments when switch 14 is on, grid power at 110V and 60 Hz is allowed to flow to circuit 1000.

In various embodiments relay 1 is a two pole two way relay that is controlled by microcontroller 11. In various embodiments, relay 1's common terminals may be electrically coupled to grid power's line and neutral. In various embodiments, relay 1's common terminals may be electrically coupled to grid power sensor 3. As will be appreciated, in various embodiments, grid power sensor 3 may be electrically coupled to grid power's line and neutral.

In various embodiments, relay 1 may include two configurable or variable terminals, which may alternately couple to a first or to a second set of components. In various embodiments, the configurable terminals of relay 1 may, by default, be electrically coupled to switch sensor 2. In various embodiments, when the primary power source is not delivering adequate power the configurable terminals of relay 1 may be electrically coupled to switch sensor 2.

According to various embodiments, when circuit 1000 is in operation, grid power sensor 3 detects the presence of grid power and sends a signal to microcontroller 11 indicative of the presence or absence of grid power. Based on the signal received from grid power sensor 3, microcontroller 11 may send a signal to relay 1 to change its state and/or connect/disconnect different poles to different components of circuit 1000. In various embodiments, if grid power sensor 3 detects the presence of grid power, then relay 1 is instructed to change or maintain its state such that its configurable poles are electrically coupled to primary light source 4 and to step down transformer 6. In this way, primary light source 4 and step-down transformer 6 may receive power directly from the power grid (or, e.g., via the intermediary of the external home or office circuit). It will be appreciated that, in various embodiments, the grid power sensor may communicate directly with relay 1 without the intermediation of microcontroller 11.

In various embodiments, primary light source 4 may be a regular light bulb (i.e., incandescent), a compact fluorescent light bulb, a fluorescent light, a light-emitting diode, an organic light-emitting diode, or any other light source. In various embodiments, once connected to grid power, primary light source 4 starts glowing and works as a regular lamp. Step down transformer 6 may be operable to convert high voltage coming from grid power to a low voltage AC (alternate current). The output of step down transformer 6 may be coupled to rectifier 7 which may be operable to convert low voltage AC to DC (direct current). The resultant direct current may be sufficient to drive the other circuit elements (e.g., secondary light source). The output of rectifier 7 may be connected to regulator 8. Regulator 8 may be a voltage regulator. Regulator 8 may be operable to stabilize the output voltage irrespective of voltage variations at the input (e.g., irrespective of voltage variations in the input supplied by rectifier 7). The output of element 8 may be connected to a charger 9 (e.g., a battery charger). Charger 9 may charge secondary power source 10. Secondary power source 10 may be a battery, for example. In various embodiments, battery 10 may supply power to other components of circuit 1000. In some embodiments, the output of regulator 8 may supply power to other components of circuit 1000. In various embodiments, the outputs of regulator 8 and battery 10 may supply power to all other components of circuit 1000 less the primary light source 4. In various embodiments, circuit 1000 may continue to operate with relay 1 connecting grid power to primary light source 4 and to step down transformer 6 so long as grid power is available.

In various embodiments, upon a failure, interruption, or discontinuance of grid power, circuit 1000 may change its operational sequence. Initially, from the vantage point of circuit 1000, a failure of grid power may not be distinguishable from a simple opening of switch 14 (e.g., from a person turning the switch off). Grid power sensor 3 may detect that grid power has failed. In turn, it may send a signal to microcontroller 11 about the detected grid power failure. Upon receiving the signal from grid power sensor 3, microcontroller 11 may send a signal to relay 1, instructing the relay to change its position and to thereby couple its configurable poles to switch sensor 2, and at the same time to decouple these polls from primary light source 4 and from step down transformer 6. Microcontroller 11 may thereupon send a signal to switch sensor 2 instructing switch sensor 2 to determine or aid in the determination of the state of switch 14 (e.g., "on" or "off"). Switch sensor 2 may send a signal out to the external circuit. For example, the switch sensor may send such signal in response to the instructions from microcontroller 11. The signal sent by the switch sensor may comprise a low voltage DC or pulsating DC signal. The signal may be sent over either the line or neutral wires based on how the circuit 1000 is connected to the external circuit. Assuming switch 14 is in "on" state, this signal passes through other appliances or gadgets connected on external network. Such appliances or gadgets could include a bulb, a fan, a refrigerator, etc. In some embodiments, the signal sent by the switch sensor could pass through the grid distribution transformer from the electricity board. Gadgets, appliances, and grid distribution transformers on the external circuit or grid may be referred to herein as "external loads". In various embodiments, the signal initially transmitted by the switch sensor 2 may complete its loop when the current returns back to circuit 1000. The returning signal may be input to or detected by microcontroller 11. The amount of current flow or change in current flow detected may vary based on the external load (e.g., the external load connected on the external circuit). In some embodiments, the returning signal may be interpreted in various ways. In some embodiments, the change in current flow is converted to a change in voltage with the help of one or more resistive elements (e.g., a resistor network). This voltage change may then be fed to an ADC (analog to digital converter) input of microcontroller 11. Microcontroller 11 may detect the change in voltage and, based on the detected voltage, determine whether or not the signal has passed through an external load. In various embodiments, if the signal initially sent by the switch sensor 2 has passed through an external load, then microcontroller 11 will detect the return current by measuring the voltage at its input. It may then be assumed that the state of the switch 14 is "on". If the signal initially sent by the switch sensor 2 has not passed through an external load, then a known or predetermined voltage may be detected at the input of microcontroller 11, and it may be assumed that the state of switch 14 is "off". In this way, microcontroller 11 may differentiate between possible states of the switch 14. In various embodiments, upon determining the state of switch 14, microcontroller 11 may send a signal to transistor 12 to drive the secondary light source 13. In various embodiments, transistor 12 may include a single transistor, or it may include multiple transistors. For example, element 12 may include a plurality of transistors, each of which may control a respective secondary light source (e.g., a respective light-emitting diode). In various embodiments, upon receiving a signal from microcontroller 11, a transistor 12 (or each transistor 12) may allow current to flow through a coupled secondary light source (e.g., through a coupled light-emitting diode).

In various embodiments, transistor 12 is a transistor which drives secondary light source 13 with constant current. In this way, a user may benefit from un-interrupted light through secondary light source 13. In various embodiments, the transition time between the failure or power in the grid and the activation of LED light is few milliseconds.

In various embodiments the secondary power source may supply power to one or more components or elements of circuit 1000. In various embodiments, the secondary power source may supply power to one or more of: the switch sensor 2, the grid power sensor 3, the microcontroller 11, and the secondary light source 13. In some embodiments, the secondary power source may supply power to the relay 1. In some embodiments, the output of the DC regulator 8 may supply power to one or more circuit elements. In some embodiments, the output of DC regulator 8 may supply power to the relay 1.

It will be appreciated that a number of possible implementations are contemplated for circuit 1000 and for various components of circuit 1000. For example, in some embodiments, microcontroller 11 may be implemented as two or more separate circuit components (e.g., as two or more separate integrated circuits). In some embodiments, various components of circuit 1000 may be combined into a single component or into a single integrated circuit.

It will be appreciated that the sequence of steps governing the operation of circuit 1000 may be varied or altered, according to various embodiments. For example, microcontroller 11 may instruct switch sensor 2 to send out a signal into the external circuit even before microcontroller 11 has instructed relay 1 to connect switch sensor 2 to the external circuit. Rather, in some embodiments, switch sensor 2 may delay its signal until such a connection has been made by relay 1, or may continue to attempt to send a signal to the external circuit until it has been connected to the external circuit. In some embodiments switch sensor 2 may periodically or continuously attempt to send a signal through the external circuit even in the absence of any explicit instructions from microcontroller 11.

In some embodiments, switch sensor may receive power from a third power source. In some embodiments, the switch sensor may receive power from a power source that is external to circuit 1000.

In some embodiments, the switch sensor may be in continuous contact with the electrical interface 5. For example, the switch sensor may be in contact with the electrical interface regardless of the state of relay 1. In this way, the switch sensor may continuously provide signals indicative of the state of switch 14, whether or not grid power is present. In various embodiments, microcontroller 11 may ignore or discount signals from the switch sensor 2 in the event that grid power is present. In various embodiments, signals output by switch sensor 2 may be relevant only when grid power is not present.

In various embodiments, the switch sensor may be disconnected or decoupled from the electrical interface when grid power is present in order to protect the switch sensor from the high incident voltage or power.

Switch Sensor

Figure 2:
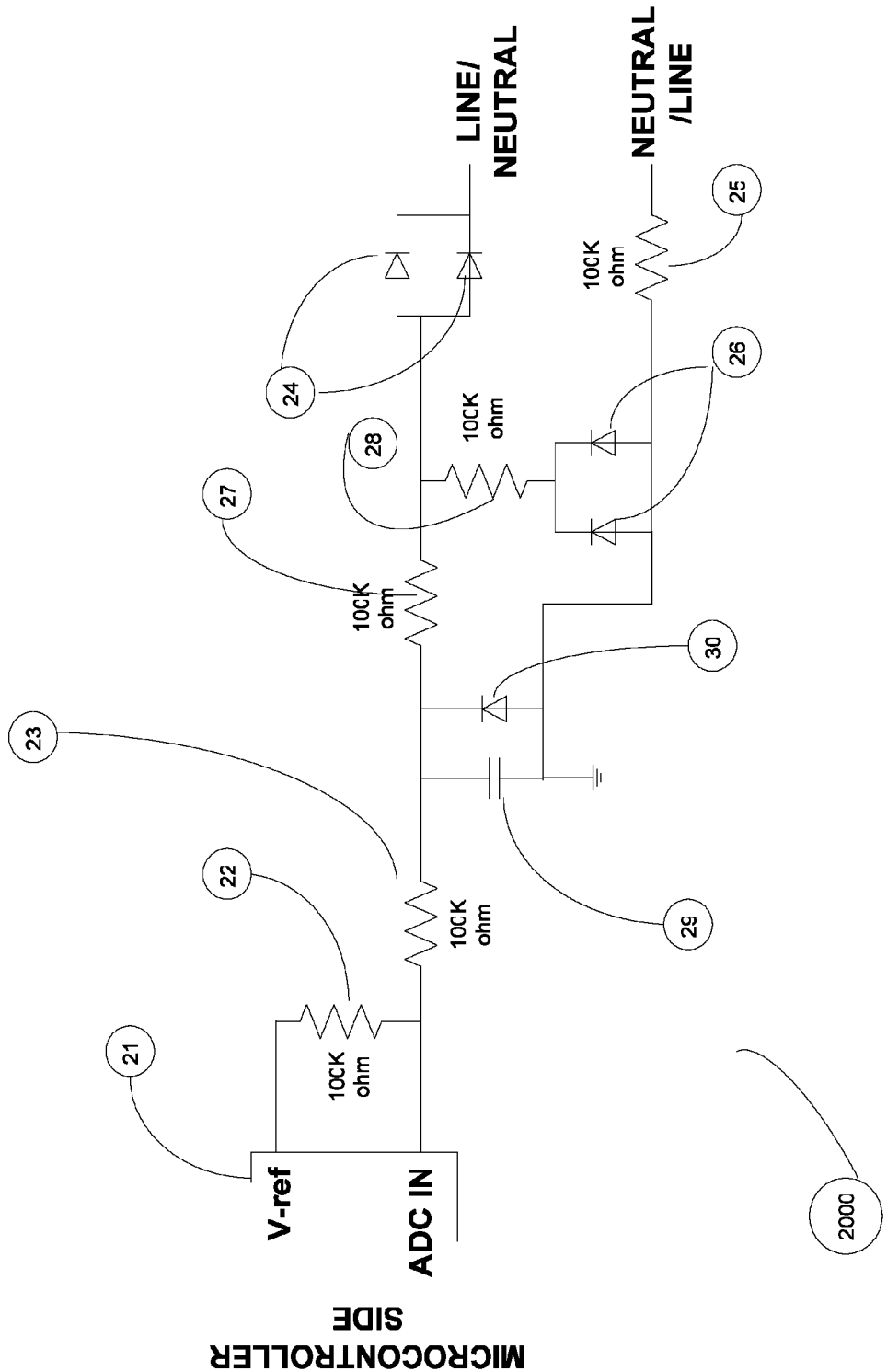
FIG. 2 illustrates a component circuit according to some embodiments.

FIG. 2 illustrates an exemplary implementation of switch sensor 2 according to some embodiments. Interface 21 (e.g., a set of pins or electrical contacts) may be coupled to microcontroller 11. One of the pins of interface 21, (e.g., the "V-ref. pin" of interface 21) may receive a reference voltage (e.g., a DC voltage) when microcontroller 11 activates the switch sensor 2. This voltage may pass through various circuit components, including resistor 22, resistor 23, diodes 24 and resistor 27, and may thereafter be applied to line terminal of the external circuit or grid network. Note that in various embodiments, switch sensor 2 may connect to the external circuit or grid power in various different ways, and may function in any manner connected. For example, the output of diodes 24 may alternatively be fed to the neutral wire, and the input of resistor 25 may alternatively come from the line wire of the grid power or external circuit. In various embodiments, circuit 1000 and/or switch sensor 2 may be connected in any fashion, order, or arrangement to the line and neutral wires. For example, circuit 1000 may function when connected in a first configuration, and may continue to function even when the electrical contacts into the circuit are reversed (e.g., are switched from line to neutral and vice versa).

In various embodiments, if an external load is connected and switch 14 is in an "on" state, then finite current may flow through elements 22, 23, 24, 25 (e.g., a resistor), 27 and the external load connected between line and neutral terminals. Based on the flow in the switch sensor 2, the change in voltage may be detected at ADC-in pin of element 21. This voltage may be used (e.g., by the microcontroller coupled to the ADC-in pin) to differentiate between conditions with load and without load.

Diodes 26, resistor 28 and diode 30 may be used for protecting the switch sensor from reverse high voltage coming from grid immediately after grid power is restored.

In various embodiments, elements 26, 28, and 30 may offer protection in the following manner. Elements 24 and 25 may be connected to the external circuit (e.g., to line and neutral wires, respectively) even when grid power is off. When grid power is suddenly restored, a positive pulse of high voltage in the neutral wire will flow through elements 25, 26, 28, 30, 27, and 24, and back out through the line wire, thereby bypassing the microcontroller 11, and thereby offering protection to the microcontroller. On the other hand, if there is a negative pulse on the neutral line, diodes 24 become reverse biased and do not allow current to flow from the line wire, thereby again protecting the microcontroller. In some embodiments, these elements protect the switch sensor until relay 1 disconnects the switch sensor from external circuit (e.g., from grid power).

In various embodiments, capacitor 29 is a filter component.

It will be appreciated that various alternative arrangements and rearrangements of circuit elements are contemplated other than the arrangement strictly depicted in FIG. 2. It will be appreciated that other component values are contemplated besides those strictly depicted in FIG. 2. For example, although FIG. 2 depicts resistors with a first resistance (e.g., 100K ohms), it will be appreciated that resistors of other values could also be used. In some embodiments, more or fewer circuit components may be used. For example, in place of a single resistor, two resistors in series or in parallel may be used. For example, instead of a single diode, multiple diodes may be used. For example, in place of multiple diodes, a single diode may be used.

It will be appreciated that, in various embodiments, certain elements or portions of switch sensor 2 may be omitted. For example, resistor 27 or resistor 28 may be omitted. In some embodiments, certain trade-offs may be effected (e.g., lesser protection to spikes in voltage may be tolerated) without comprising or obviating the basic function of switch sensor 2.

In various embodiments, switch sensor 2 may be implemented as a voltage divider with a reference element (e.g., a resistor) placed in series with the external circuit. In this case, the voltage detected across the reference element (or across the external circuit) may be sufficient to determine whether or not switch 14 is open.

As will be appreciated, various other implementations of switch sensor 2 may be possible while maintaining the functionality in keeping with various embodiments. For example, various embodiments contemplate various implementations where a test current or signal is output to the external circuit, and a resultant voltage or current is analyzed to determine whether or not the signal or current has passed through an external load.

In various embodiments, the switch sensor 2 may assume some additional functionality of the microcontroller 11. For example, switch sensor 2 may itself determine whether or not switch 14 is open. In some embodiments, microcontroller 11 may assume some additional functionality of the switch sensor.

Figure 3:
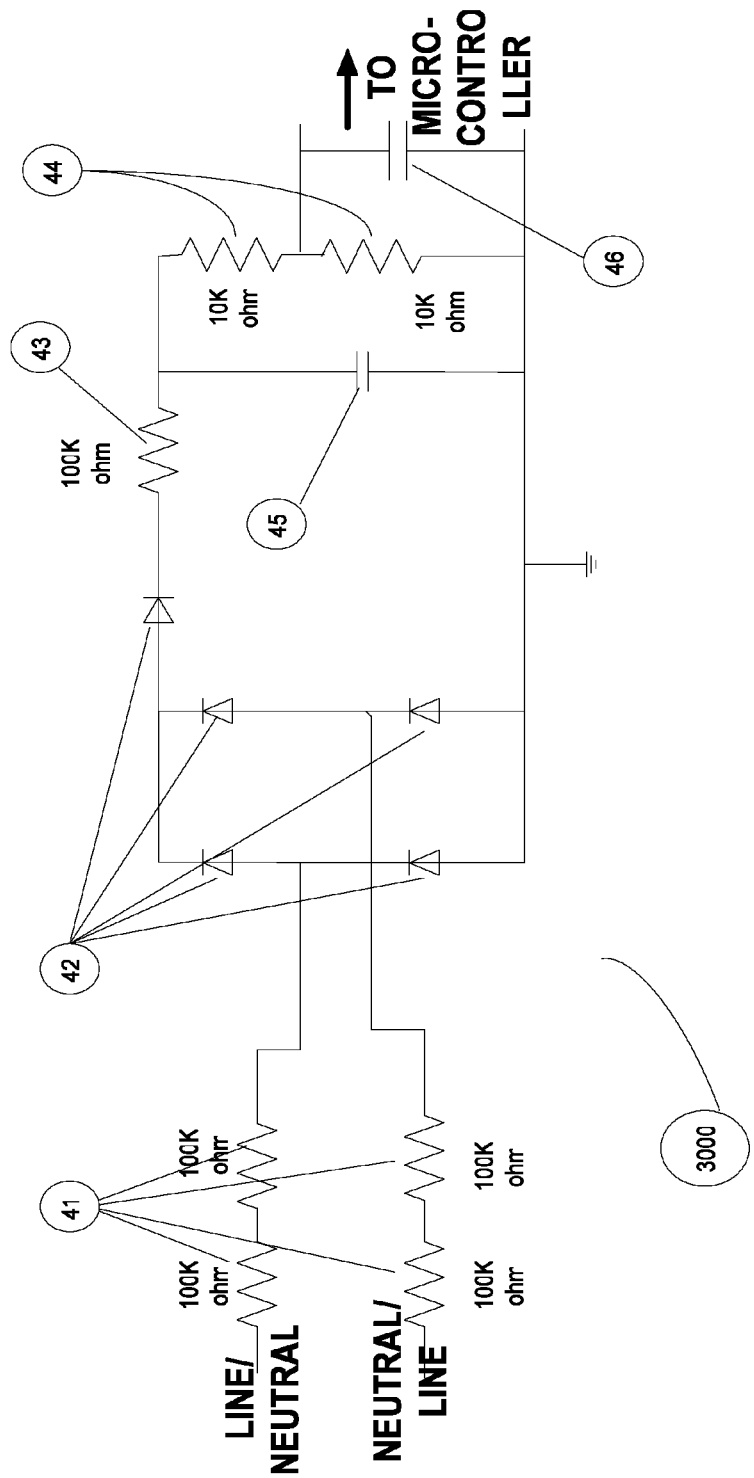
FIG. 3 illustrates a component circuit according to some embodiments.

FIG. 3 depicts an exemplary grid power sensor 3 according to some embodiments. Resistive elements 41 may receive power from the external circuit (e.g., from line and neutral wires) and may function to reduce the voltage coming to the rest of the circuitry. Diodes 42 may form a full wave rectifier which functions to convert an input AC signal to a DC signal. As will be appreciated, various alternative implementations of a full wave rectifier are also possible and are contemplated according to various embodiments. Resistive element 43 may reduce the generated DC voltage (e.g., from the full wave rectifier) to a lower level (e.g., to a level which is low enough that microcontroller 11 can detect whether grid power is present or not. Resistive elements 44 may further divide the voltage. The microcontroller 11 may detect the voltage across one of the resistive elements 44 to detect whether or not a voltage is present, and consequently whether grid power is present. In the absence of grid power there may be no voltage detected across one of the resistive elements 44. In various embodiments, microcontroller 11 may continually or periodically poll the status of this pin (e.g., the voltage across one of the resistive elements 44) in order to determine the mains or grid power status. Element 45 and 46 are filter capacitors.

It will be appreciated that various alternate arrangements of elements and components are possible and are contemplated within the spirit and scope of various embodiments. It will be appreciated that various alternative values for different circuit elements may be used while still falling within contemplated embodiments. For example, for resistive elements 41, resistors of values other than 100K ohms may be used (e.g., resistive elements with values of 200K ohms may be used). It will be appreciated that various elements may be combined in various embodiments. For example, resistive elements 41 may include only two separate resistors rather than four separate resistors. It will be appreciated that a plurality of circuit elements may be used in place of a single circuit element, in various embodiments. It will be appreciated that a given functionality may be accomplished with a different number, a different variety, or a different arrangement of circuit elements, according to various embodiments.

Figure 4:
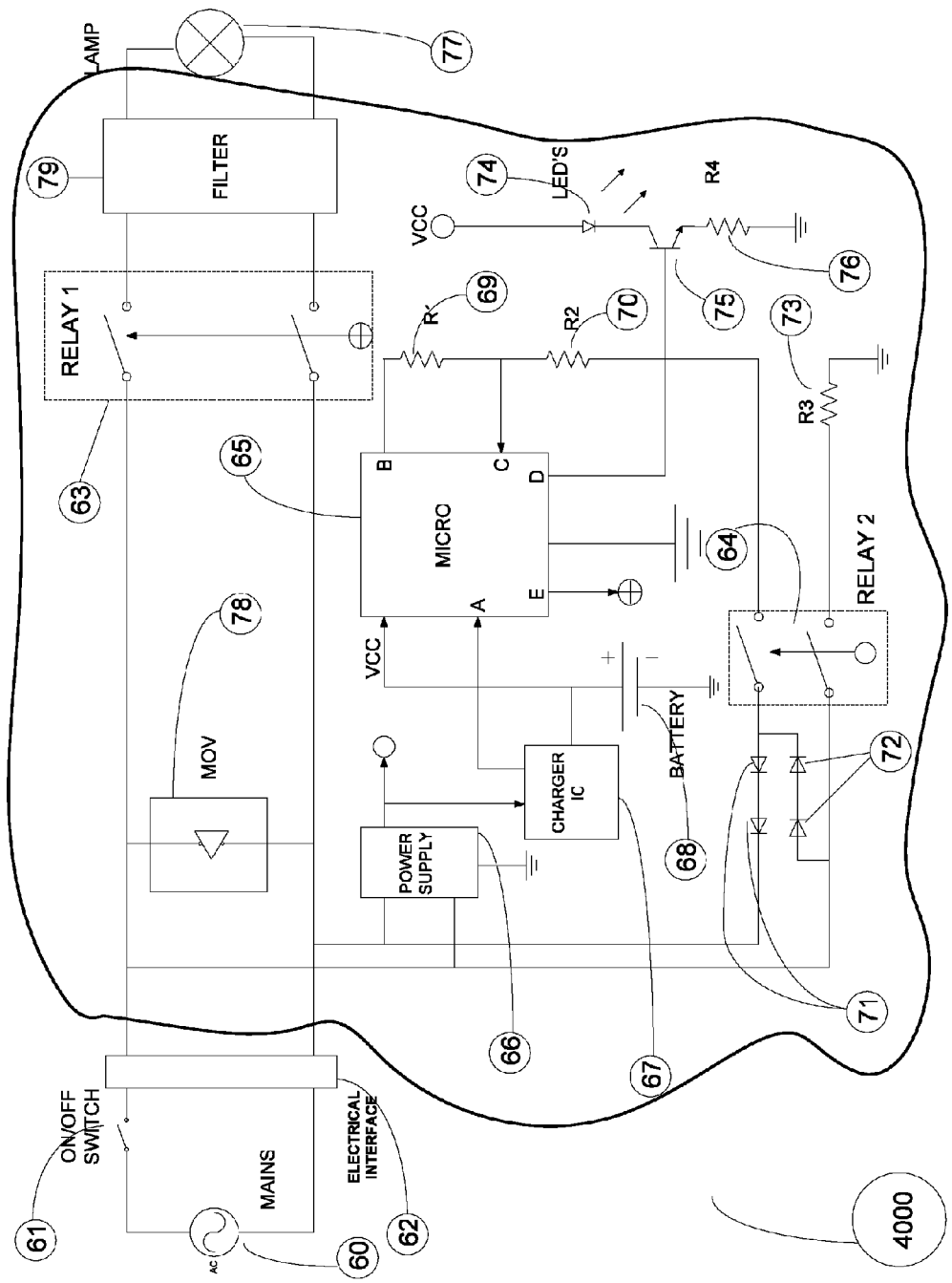
FIG. 4 illustrates a circuit according to some embodiments.

FIG. 4 depicts a circuit 4000 according to various embodiments. In various embodiments, element 60 is a source of grid power or any other primary source of energy. Power may be, for example, 110V/60 Hz or 230V or 220V/50 Hz AC.

According to various embodiments, switch 61 may be a wall mount or any other switch, button, or controller available in the home or office or any other environment or electrical network. Switch 61 may be connected to an electrical interface 62 to control the device connected to this electrical interface. In various embodiments, the remaining elements, (i.e., elements depicted in circuit 4000 not including elements 60, 61, 62, and 77) may be part of a self-contained circuit. Such self-contained circuit may be detachable from the electrical interface 62, for example. In some embodiments, light source 77 may also be a part of the self-contained or detachable circuit.

Circuit 4000 is hereafter described in two circumstances:
1. Availability of grid power. In this circumstance, according to various embodiments, the state of switch 61 is not checked or polled explicitly.
2. Failure of grid power. In this circumstance, according to various embodiments, the state of switch 61 may be checked or polled.

A circumstance where grid power is available is now described, according to various embodiments. Element 66 is a power supply which converts high voltage AC to low voltage DC. The power supply may use switch mode power supply technology (SMPS). As will be appreciated, in various embodiments, other technologies may be used. Power supply 66 may obtain power input whenever the grid power is available. In turn it may supply DC output to element 67 (a charger circuit) and control signal for element 64. Element 64 is a relay which connects a circuit for sensing the state of switch 61 (i.e., a switch sense circuit) to grid line interface in the event of grid failure (e.g., a loss of power in the grid). This is achieved with the help of power supply 66. Power supply 66's output is inverted and given to a control circuit which operates the relay 64. Relay 64 closes its terminal when the grid power fails and vice versa with the help of power supply 66's logic, and with the help of battery voltage to operate the logic and relay. In other words, in various embodiments, in the absence of grid power, power from a battery 68 may power the relay as well as logic used to control the relay. Element 67 is a charger circuit, and may function to charge the battery 68. In various embodiments, whenever there is grid power available, the power supply 66 outputs DC voltage which is input to charger IC (element 67) which in-turn charges element 68.

Element 65 is a microcontroller which may perform various functions. Such functions may include logic and control functions for operating other elements within circuit 4000. Microcontroller 65 should know the status of grid power availability. Element 67 may send the status of grid power to microcontroller 65 on one of its input pins (e.g., on its pin A). Element 67 may be made aware of the status of grid power via a signal from power supply 66. Element 67 may send a logic high signal on pin A of microcontroller 65. If microcontroller 65 receives logic high status on pin A then it may turn the element 63 ON. According to various embodiments, element 63 is another relay which connects its pin such that grid power is connected to element 79 and 77. Element 77 is a primary light source which could be an LED, incandescent, CFL or fluorescent. This means that in the presence of grid power element 77 is ON and therefore emits light. Element 79 is filter which protects the element 77 and the rest of the circuit from high frequency spikes coming from the grid power. Element 78 is a MOV (metal oxide varistor) which protects the element 77 and the rest of the circuit from over voltage variations coming from grid power.

A circumstance where there is a failure of grid power is now described, according to various embodiments.

Grid power failure is detected by power supply 66 and then in-turn element 67. Element 67 pulls pin A of element 65 to logic low. Now microcontroller 65 knows that there is grid failure through the status of pin A. Now, in various embodiments, microcontroller 65 determines whether there has been a genuine grid failure or whether switch 61 is open. In both cases, the grid power would not be available to the circuit to the right of the electrical interface. Microcontroller 65 may accordingly turn element 63 OFF (open) so that elements 79 and 77 get disconnected from grid power lines. Microcontroller 65 may send the command to turn the element 63 OFF through its pin E. Also relay 64 gets connected (ON) to the grid power lines with the help of logic changes in power supply 66. Next, microcontroller 65 may send a reference signal on its pin B. This reference signal could be DC voltage (e.g., a voltage similar to battery voltage) or pulsating DC voltage. This reference signal is passed through the grid power lines through elements 69, 70, 71. The reference signal finds the return path through external network if element 61 is in a closed state. If element 61 is closed then this reference signal finds the return path through nearby load available on the electrical grid network. This load could be any electrical or electronic gadgets connected on the grid network e.g., television, other lamp loads (LED, CFL, fluorescent, other similar circuits, etc.) etc., or the electricity boards transformers secondary winding. This reference signals comes back to the circuit (e.g., to the portion to the right of the electrical interface) and completes its return path through element 73 and ground. By virtue of the reference signal completing its path, there is some voltage generated across pin C of microcontroller 65 with respect to ground. This voltage at pin C is may be detectably different than the voltage at the same pin when switch 61 is open. In the case when switch 61 is open there is no external path for the reference signal so the voltage generated at pin C is a known voltage. This becomes the reference voltage for comparison. Any voltage different than this reference voltage may indicate that the switch is in a closed state. Microcontroller 65 may make a decision based on this comparison. If microcontroller 65 finds a different voltage than the reference voltage then it determines that switch is closed and may take next following actions, in various embodiments:

1. Sends logic high on pin E such that it turns the secondary light ON.
2. Keep polling the status of pin C to know the latest state of switch 61. The process of polling the state of the switch may employ circuitry that will be referred to herein as a switch sensor.

The elements 74, 75 and 76 are part of a secondary light circuit. Element 74 is the secondary light source. Elements 75 and 76 represents the driver circuit to drive the LED light. Element 74 could be LED or any other light technology. The circuit design may vary based on the type of light technology used, according to various embodiments. FIG. 4 depicts the secondary light as an LED.

In various embodiments, the primary and secondary light could be same. It will be appreciated that the design of lighting circuitry or of circuit 4000 may vary while maintaining the spirit of its intended function.

At any point of time if pin C detects voltage equal to reference voltage on its pin then it may conclude that the switch 61 has been turned to an OFF state. In this case microcontroller 65 may turn the secondary light OFF by sending the logic low on its pin D. It keeps polling the status of pin C's voltage (e.g., continuously) to ascertain the status of switch 61. Also microcontroller 65 may keep track of the battery power. If microcontroller 65 finds that the battery is drained to a level where it can't supply sufficient power to drive the circuit 4000 (or relevant parts thereof) then it may change its mode to sleep mode such that limited power (e.g., very low power; e.g., drastically reduced power) is drawn from the battery. Elements 71 and 72 may protect the switch sensor from sudden high voltage coming from grid lines after recovery of grid power.

In various embodiments, a lamp (e.g., elements 74 and 77) could be internal or external to a self-contained circuit. In various embodiments, both primary and secondary lights could be one and the same.

In various embodiments, Pin D could be PWM out (pulse width modulation) to control the light intensity based on the charge left in the battery or any other intended function.

In various embodiments, the battery could be internal or external to a self-contained circuit according to various embodiments.

In various embodiments, circuit 1000 and/or switch sensor 2 may determine the state of switch 14 by detecting a power distribution transformer. The power distribution transformer may assist in the distribution of power from generator to retail customer, and its detection may imply a closed or "on" state of switch 14, in various embodiments. A power distribution transformer may be detected by sending pulsating DC or high voltage using voltage doublers. In some embodiments, a power distribution transformer may be detected by sending pulsating AC.

Figure 5:
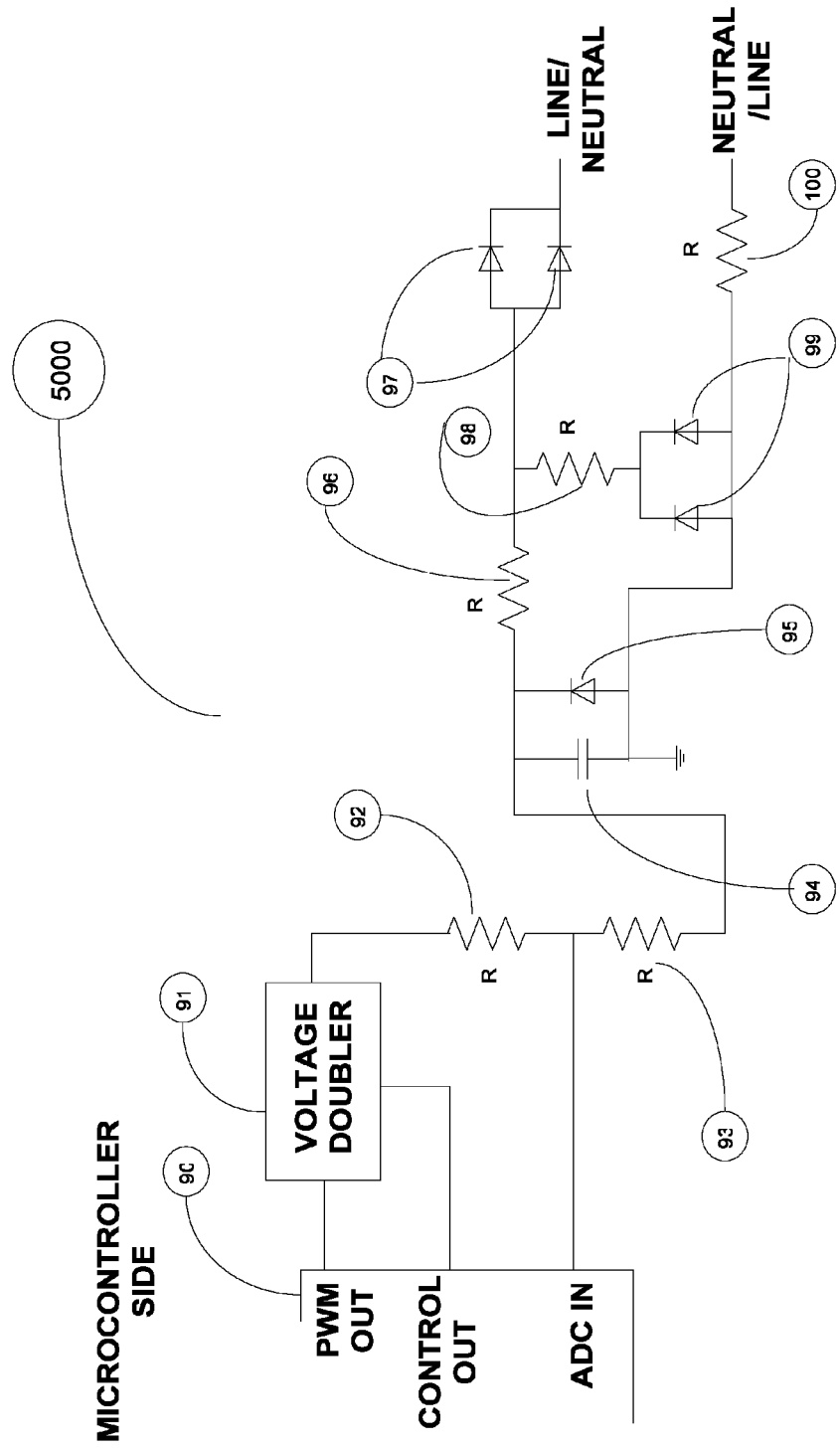
FIG. 5 illustrates a component circuit according to some embodiments.

FIG. 5 illustrates an exemplary circuit 5000 for determining the state of a switch, according to various embodiments. Circuit 5000 may be used, in various embodiments, to detect high input impedance loads such as CFL bulbs, and SMPS based devices like televisions, laptop power supplies, etc.

Microcontroller portion 90 includes three pins (e.g., input or output terminals) of a microcontroller (e.g., microcontroller 11). In various embodiments, a reference signal to detect the switch is sent through the PWM (pulse width modulation) out pin of the element 90. The frequency and duty cycle of the PWM signal can be varied based on the tuning of the circuit to detect the high input impedance load. In some embodiments, the high input impedance load has a high value capacitor which gets charged through a rectifier diode in the input path.

Figure 6:
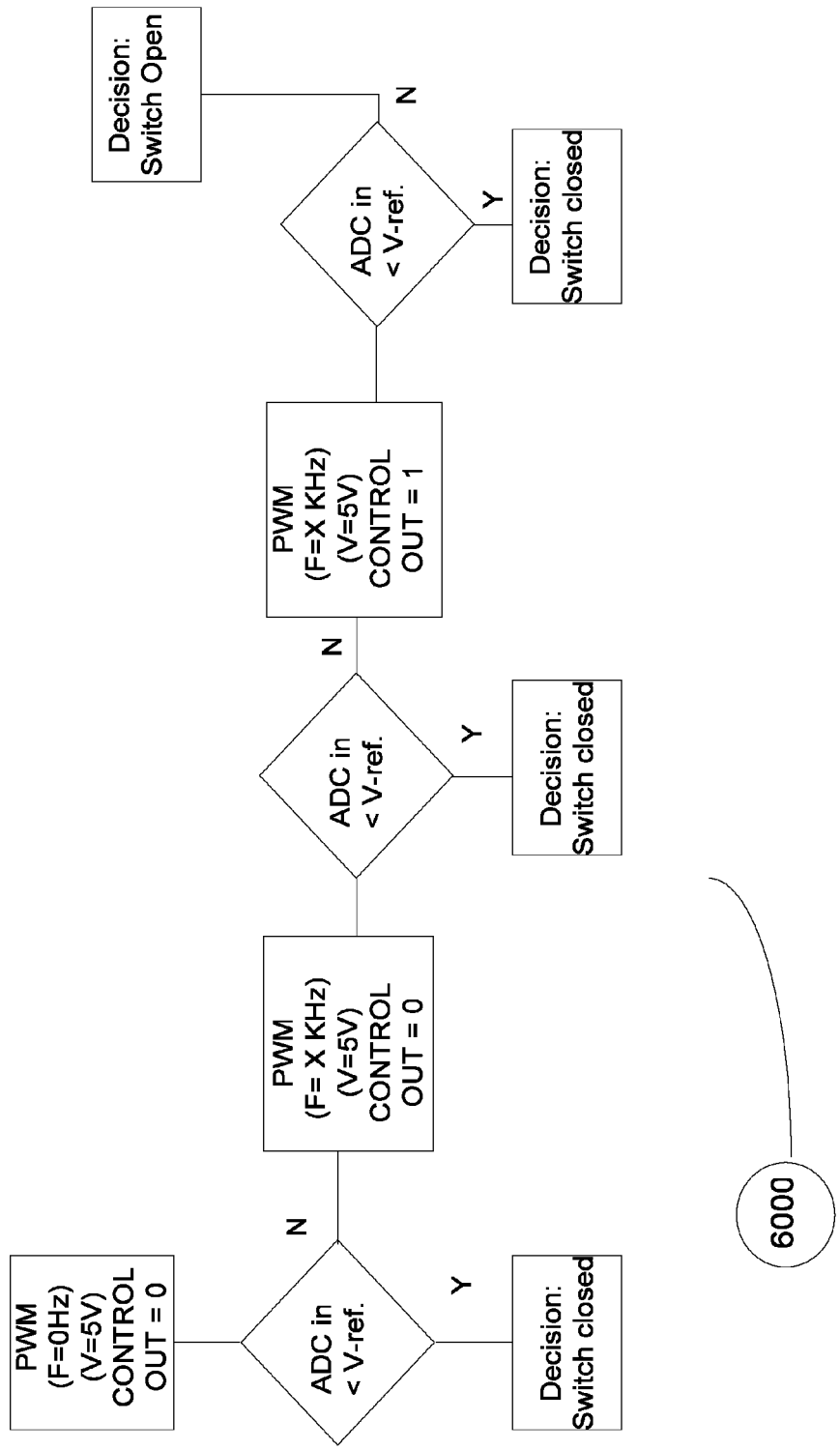
FIG. 6 illustrates a process flow according to some embodiments.

Element 91 is a voltage doubler which amplifies the input voltage by a predetermined factor. The voltage doubler is controlled with the help of element 90. The control output of element 90 may send a command to element 91 to turn its voltage amplification circuit ON or OFF. In some embodiments, if the command sends logic low then the amplification factor is set as 1 (one), in which case the voltage doubler's output is the same as its input. If the command sends logic high then voltage doubler amplifies the input voltage by the predetermined factor. The predetermined factor may be 1.5 or 2, in various embodiments. The predetermined factor may depend on the tuning of the intended function, in various embodiments. The decision of control output is taken by the ADC-in signal. The following algorithm 6000, illustrated in FIG. 6, briefly explains the same.

Algorithm 6000 functionally describes the sequence of operation for a switch detect circuit (e.g., a switch sensor), according to some embodiments. The whole algorithm may repeat, cycle, or otherwise be executed periodically or continuously under the circumstances of grid failure. In some embodiments, the frequency or cycles of operation and number of ADC samples in each cycle can be fine-tuned in order to improve accuracy and/or response time.

In a first step PWM is set to send the DC signal out and the voltage doubler is set with amplification factor as 1. In this situation if the ADC-in detects the voltage lower than the reference voltage (V-ref, reference voltage is the known voltage under the circumstances of switch open condition and no external load) then decision is taken as switch is closed. But if the ADC voltage is not less than V-ref. then there might be a condition that the load is offering high input impedance. In such case PWM is set to send a pulsating signal without any amplification. With this the load capacitor will start charging for the duration when pulse is ON. At the same time the ADC voltage will not be same as V-ref as ADC voltage will be dropped as per the charging pattern of the load capacitor. The ADC is synchronized with the PWM pulse such that ADC voltage is checked when pulse is high. Now if ADC-in is less than V-ref. then it may be inferred that there is some external high input impedance load responding to the switch sense circuit.

Still if the ADC voltage is same as V-ref then there is chance that there is no conduction in the external load. Sometimes external loads do not conduct at lower voltages. But, by sending little high voltage in pulsating form, the external load can be made to conduct, in some embodiments. Also high voltage in pulsating form can travel longer distance and ensures that circuit is completed with electricity board's transformer.

In various embodiments a switch sensor, a microcontroller, or a combination thereof may be operable to poll the state of a switch on an external circuit. The polling may include sending out a first signal (e.g., a first test signal) and then measuring a first response to the first signal. The measured response may be a voltage measured across a resistor (e.g., a resistor placed in series with the external circuit, thereby producing a voltage divider). The measured response may be a current, or may be any other response. The first response may be compared to a first reference response. In various embodiments, the first reference response is a zero-voltage differential across a resistor. Thus, in various embodiments, the comparison of the first response to the reference signal may include determining if the first response is a zero-voltage differential. If the first response matches the first reference response, then polling may continue with a second signal. The second signal may include a signal that is more capable of flowing through an appliance or other externally connected device of a given impedance. A second response to the second signal may be compared to a second reference response (e.g., to a zero-voltage differential). If there is a match, then a third signal may be sent out through the external circuit. Once again, a third response may be compared to a third reference response (e.g., to a zero-voltage differential). In some embodiments, if there is a match between the first response and first reference response, between the second response and the second reference response, and the third response and third reference response, then it may be concluded that no signals have successfully passed through any part of the external circuit, and therefore that the switch controlling circuit 1000 is open, or "off". However, if any of the first, second, or third responses have not matched their respective reference signals, then it may be concluded that the signal(s) creating the non-matching responses have successfully completed the loop of the external circuit, and therefore that the switch controlling circuit 1000 is closed, or "on".

Various embodiments include an apparatus (e.g., a switch sensor; e.g., a switch sensor and microcontroller; e.g., circuit 1000) operable to:
send a first signal, in which the first signal comprises a flat signal of a first voltage;
measure a first response to the first signal;
send, in the event that the first response matches a first reference response, a second signal, in which the second signal comprises a pulsating signal of the first voltage;
measure, in the event that the first response matches the second signal, the second response to the second signal;
send, in the event that the second response matches a second reference response, a third signal, in which the third signal comprises a pulsating signal at a second voltage that is higher than the first voltage;
measure, in the event that the second response matches the second reference signal, a third response to the third signal;
transmit a fourth signal causing the activation of a secondary light source in the event that the first response does not match the first reference response, the second response does not match the second reference response, or the third response does not match a third reference response.

Note that in some embodiments, in a situation where there are more than one of circuit 1000 in the same network, there may be a possibility of signal collisions. In various embodiments, the circuit performance may be improved by changing the phase and timing of the pulsating signal in real time and synchronizing the rest of the circuit with phase or time change for reliable detection of the signal.

In various embodiments, the primary light source and the secondary light source may be one and the same. In some embodiments, a single light source may function at different levels (e.g., at different luminosities) depending on whether it is drawing power from the primary power source or from the secondary power source.

In various embodiments, in place of a relay, high power opto-couplers or active semiconductors switches (e.g., TRIAC) may be used.

Figure 7:
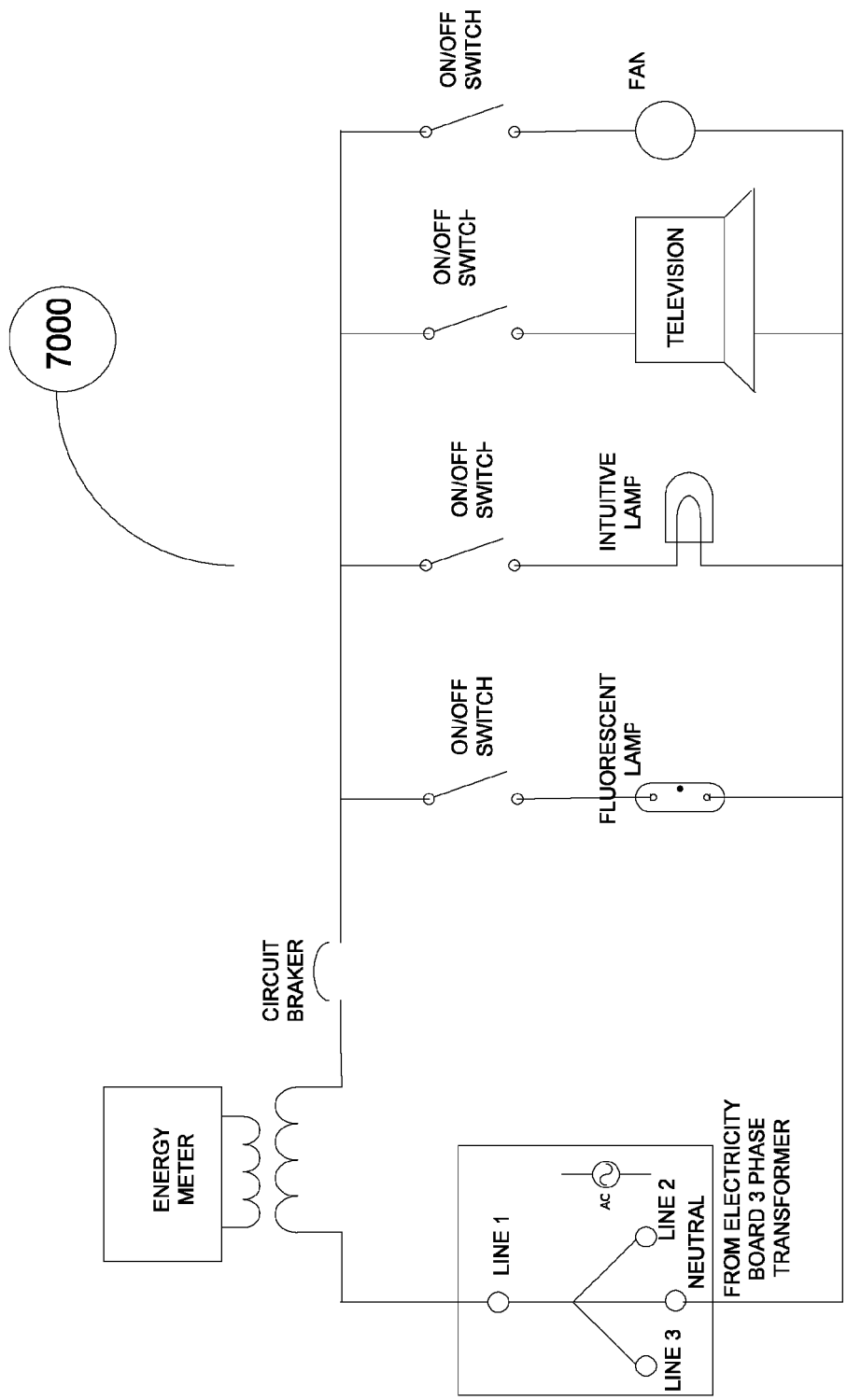
FIG. 7 illustrates an exemplary home or building wiring system, according to some embodiments.

FIG. 7 depicts an exemplary household or building circuit 7000, according to some embodiments. Such a circuit may constitute an external circuit according to various embodiments described herein. An apparatus according to various embodiments may interface with circuit 7000 (e.g., an "external circuit"), in various embodiments.

Circuit 7000 may include one or more appliances. Such appliances may include, for example, lights (e.g., fluorescent lamp; e.g., lamp), a television, and a fan. It will be appreciated that other appliances may exist on circuit 7000. In various embodiments, an appliance may be controlled by a switch. In various embodiments, an appliance may be controlled by a separate switch. In various embodiments, each appliance may be controlled by a separate switch. In various embodiments, appliances may be connected in parallel. For example, in various embodiments, appliances may be connected in parallel across live and neutral wires.

In various embodiments, devices or objects connected in parallel include only appliances, and do not include stand-alone circuit elements, such as capacitors.

An apparatus according to various embodiments may be connected in parallel to one or more appliances on circuit 7000. An apparatus according to various embodiments may constitute an appliance on circuit 7000. As will be apparent, if an apparatus according to various embodiments (e.g., circuit 1000) is connected in parallel to one or more appliances shown in circuit 7000, then the apparatus may send a test signal that passes through one or more appliances before returning to the apparatus. For example, an apparatus according to various embodiments may send a test signal via one of the live or neutral wires, after which the signal may pass through one or more of the appliances and return to the apparatus via the other of the live and neutral wires. If the signal does return, then it may be inferred that the switch controlling the apparatus (e.g., circuit 1000) is in fact in an "on" or closed state. This inference may be made, in various embodiments, because the apparatus (e.g., circuit 1000) would be connected in series with a switch controlling it, and therefore the return signal would have had to pass through the closed switch.

Figure 8:
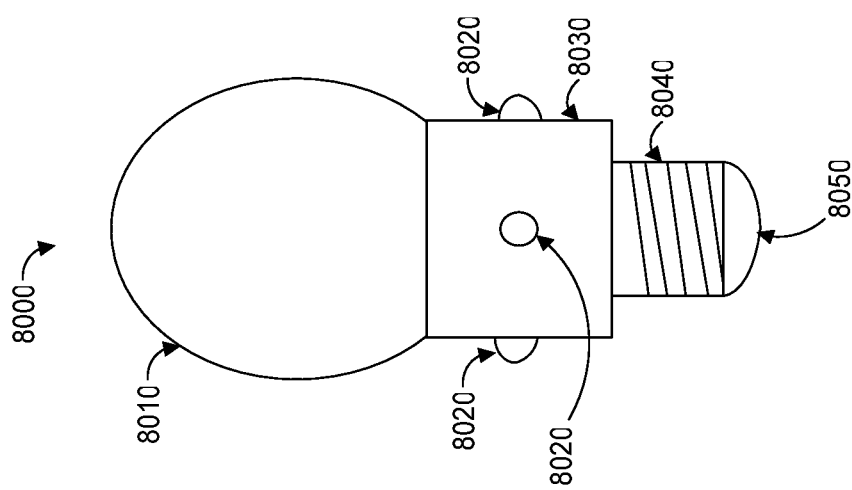
FIG. 8 illustrates an arrangement of an apparatus according to some embodiments.

FIG. 8 illustrates an exemplary apparatus 8000 according to various embodiments. The apparatus includes a primary light source 8010 (e.g., an incandescent bulb), secondary light sources 8020 (e.g., LEDs), a housing for control logic and circuitry 8030, a first electrical contact and mechanical interface to a bulb socket 8040, and a second electrical contact 8050. The secondary light sources may include four LEDs, one on each of four sides of housing 8030. However, it will be appreciated that many other arrangements are possible. The electrical contact and mechanical interface 8040 may include a spiraling ridge so that the entire apparatus can screw into a light bulb socket. The second electrical contact 8050 may be electrically insulated or sequestered from the first electrical contact. Together, the two contacts may constitute an electrical interface to an external circuit (e.g., to a home circuit; e.g., to respective live and neutral wires). In various embodiments, the housing 8030 may contain one or more components of circuit 1000. As will be appreciated, FIG. 8 is but one illustrative depiction, and many other arrangements, component quantities (e.g., numbers of LEDs), component varieties (e.g., varieties of light sources), shapes, sizes, configurations, etc., are contemplated according to various embodiments.

FIGS. 9 through 19 illustrate exemplary schematics for circuits, sub-circuits, and circuit components described herein. It will be appreciated that these schematics represent a subset of potential implementations, that depicted component values represent a subset of potential component values, and that component arrangements represent a subset of potential arrangements as contemplated according to various embodiments.

In some embodiments, multiple apparatuses according to various embodiments may be used connected to the same external circuit (e.g., to the same household circuit). Such apparatuses may work in harmony (e.g., may avoid interferences or misinterpretation of one another's signals) via phase shifts in pulsating DC signals emitted by the respective apparatuses.

FIGS. 9-14

FIGS. 9 through 14 depict an exemplary implementation of a circuit according to various embodiments. The depictions may represent a possible implementation of circuit 1000, and illustrate exemplary parts and components for this possible implementation. It will be appreciated, however, that other component and parts selections are contemplated, according to various embodiments.

Figure 9:
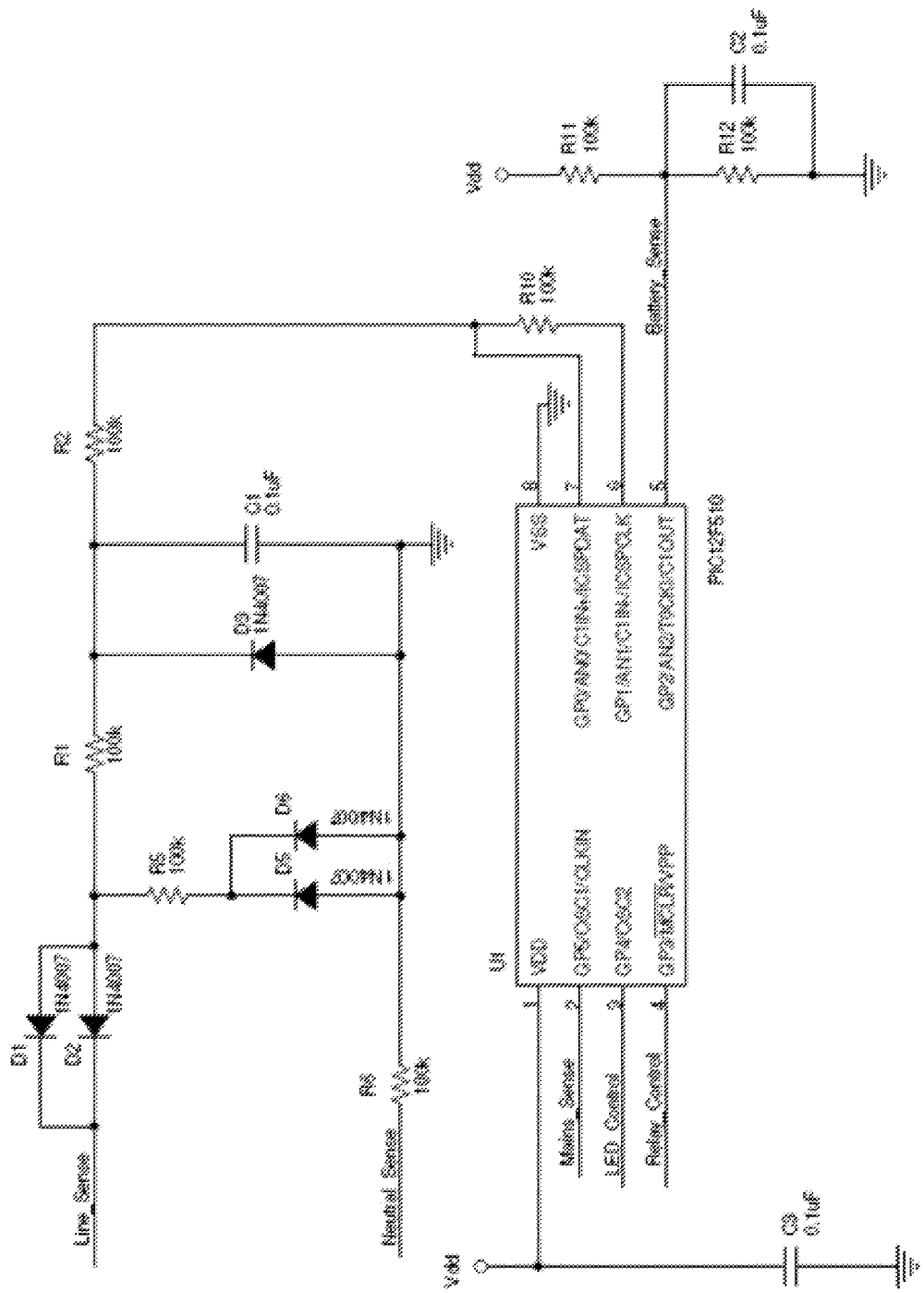
FIG. 9 illustrates a schematic of a microcontroller according to some embodiments.

FIG. 9 illustrates a schematic of a microcontroller according to some embodiments.

Figure 10:
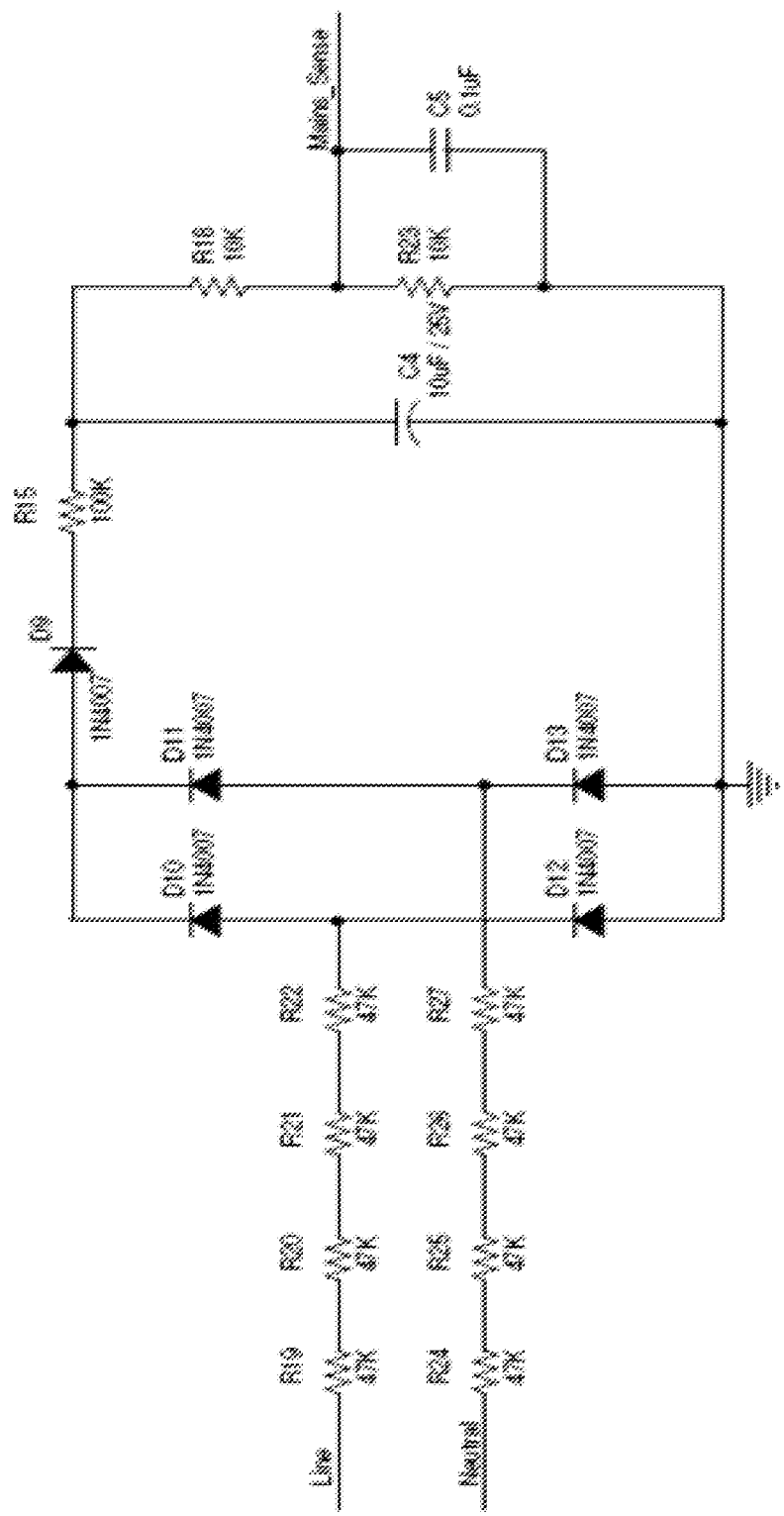
FIG. 10 illustrates a schematic of grid power sensor according to some embodiments.

FIG. 10 illustrates a schematic of grid power sensor according to some embodiments.

Figure 11:
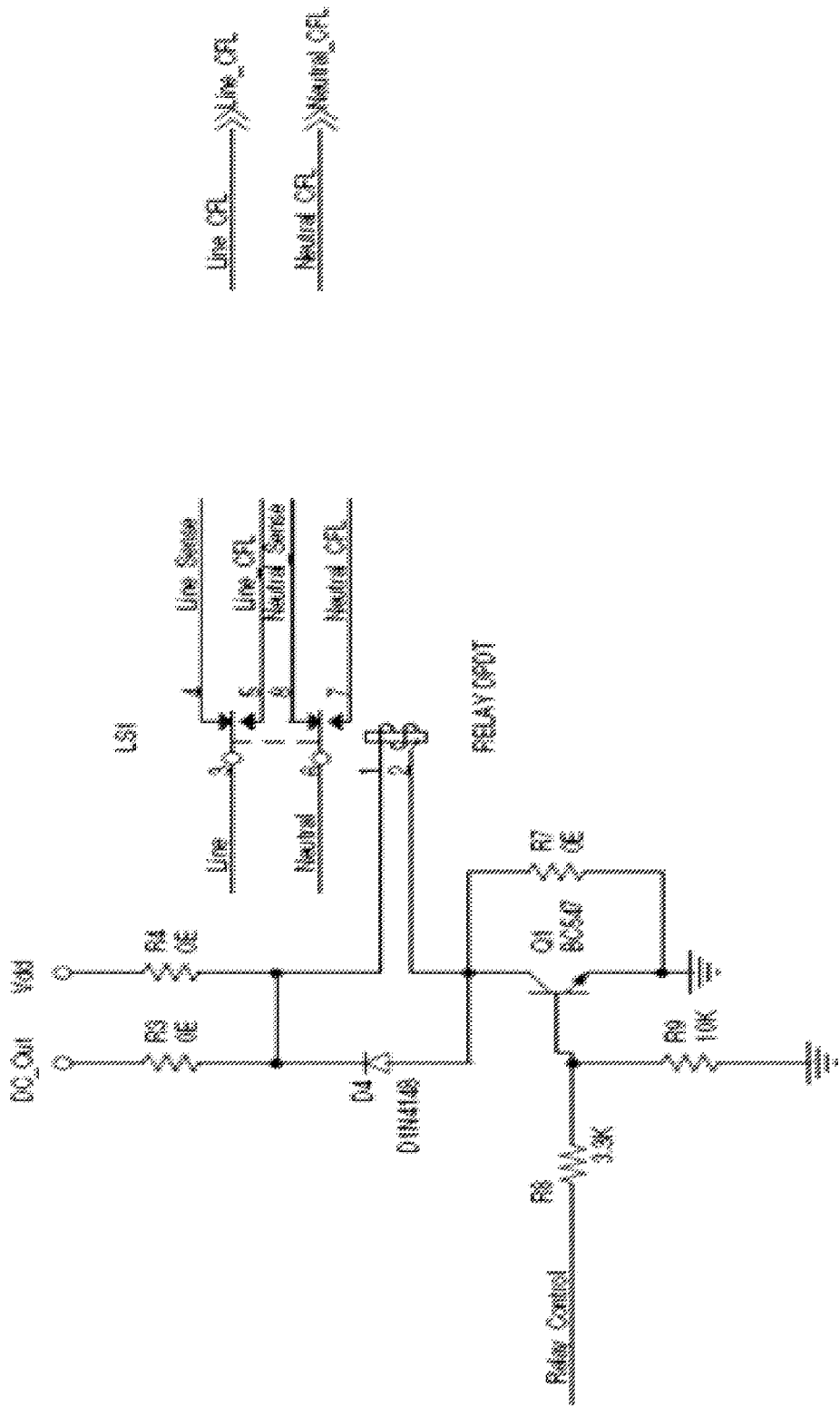
FIG. 11 illustrates a schematic of a relay according to some embodiments.

FIG. 11 illustrates a schematic of a relay according to some embodiments.

Figure 12:
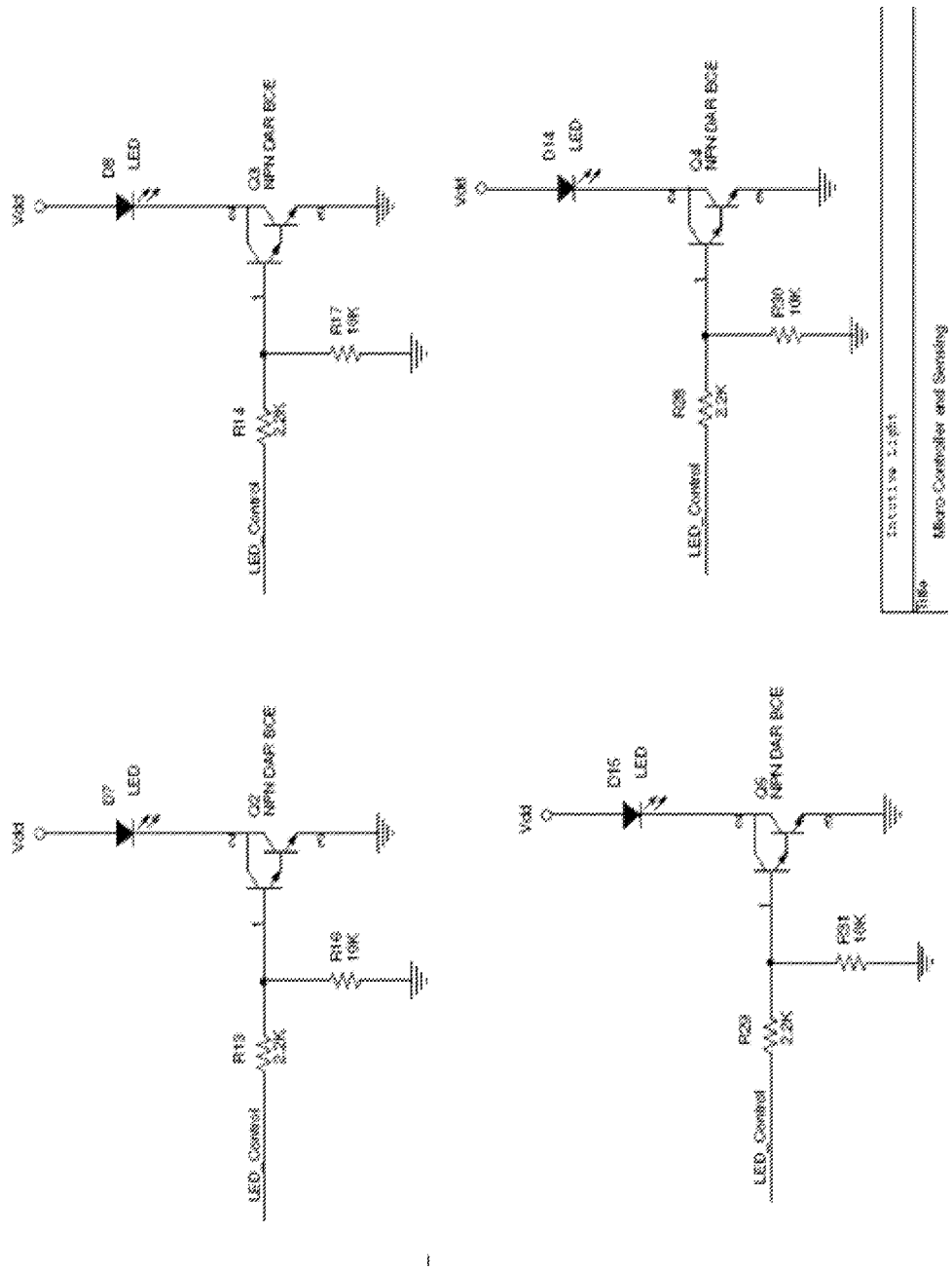
FIG. 12 illustrates a schematic of an LED, driver for the LED according to some embodiments.

FIG. 12 illustrates a schematic of an LED, driver for the LED according to some embodiments.

Figure 13:
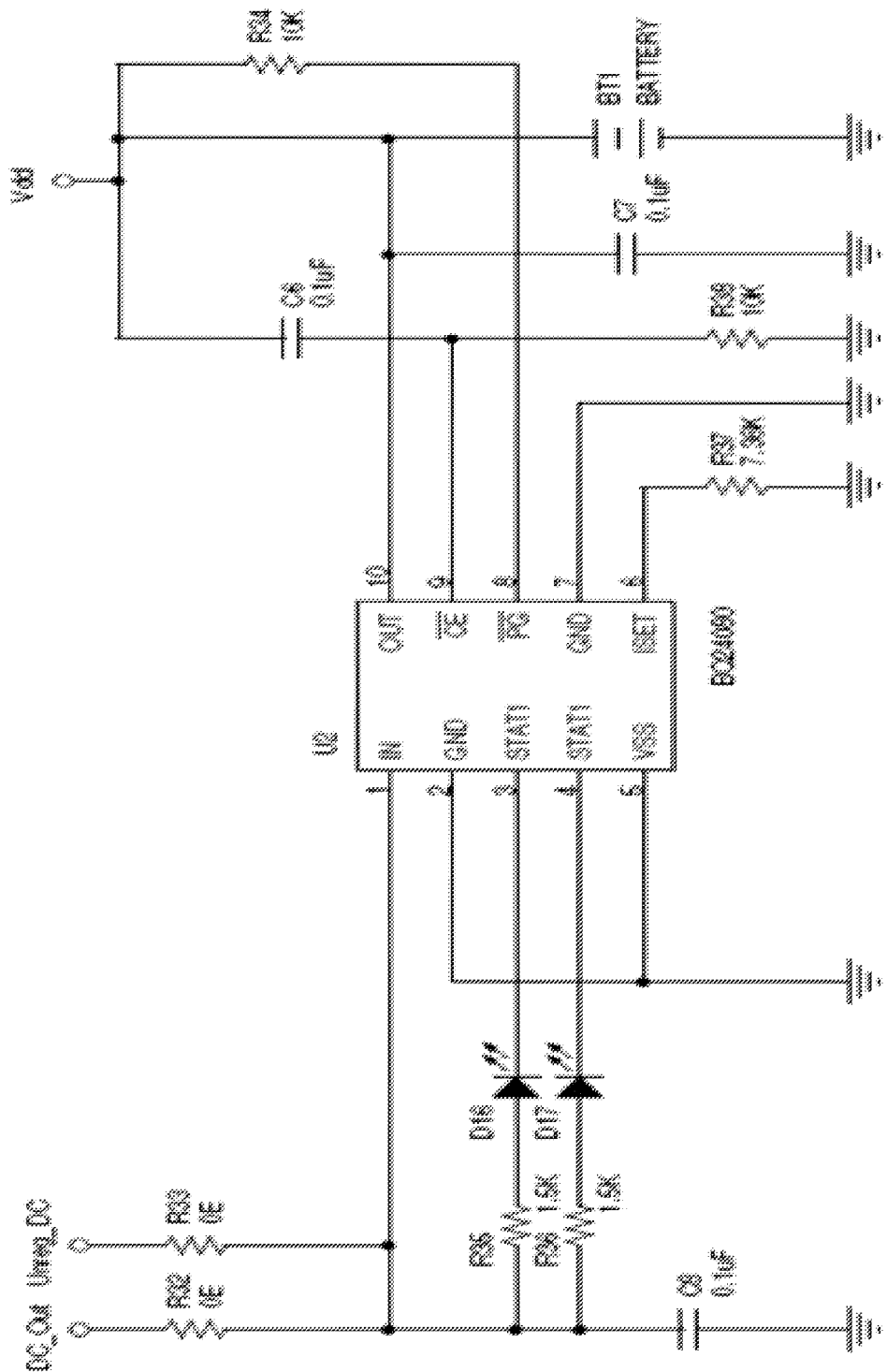
FIG. 13 illustrates a schematic of a charger and a battery according to some embodiments.

FIG. 13 illustrates a schematic of a charger and a battery according to some embodiments.

Figure 14:
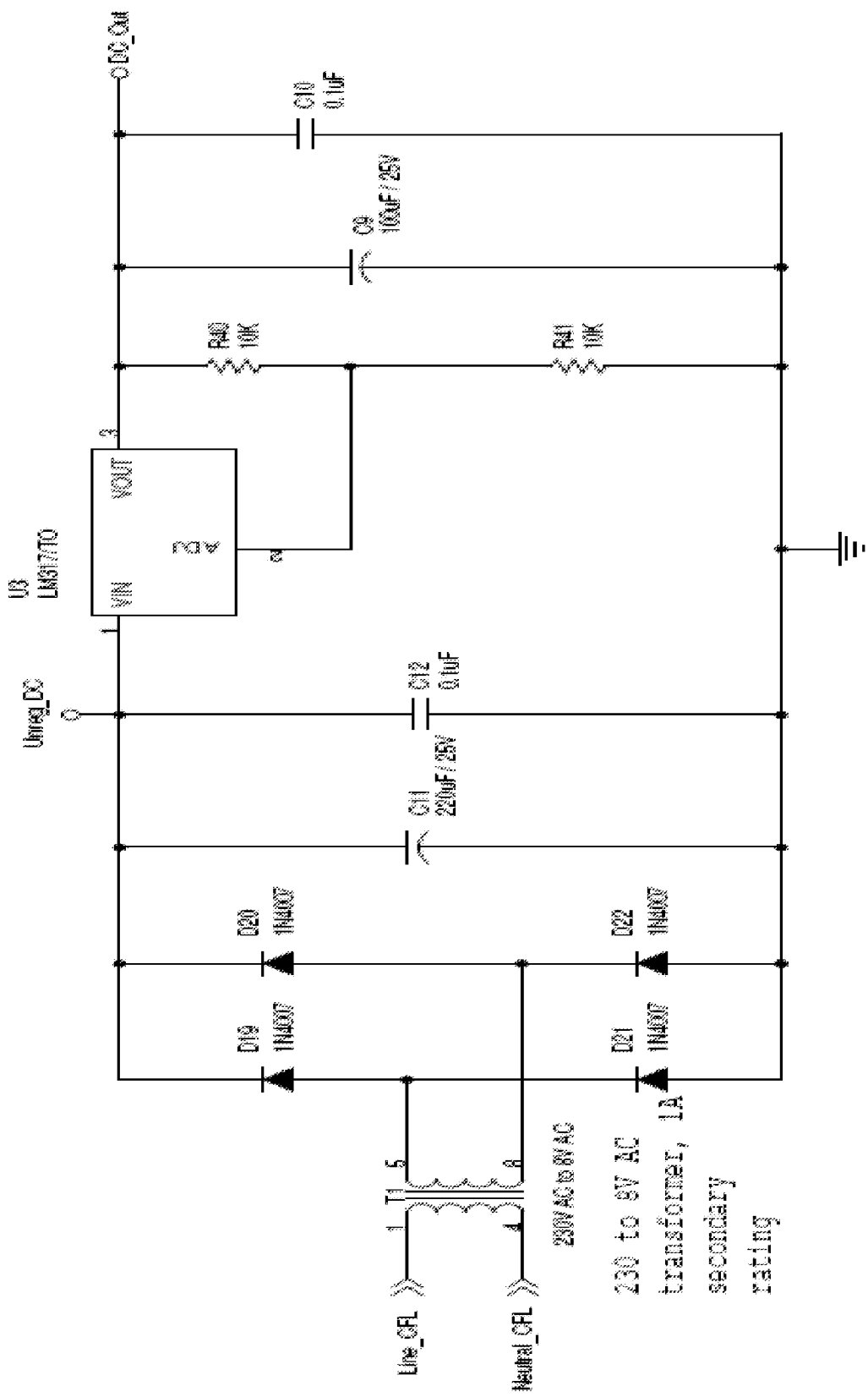
FIG. 14 illustrates a schematic of transformer, rectifier and regulator according to some embodiments.

FIG. 14 illustrates a schematic of transformer, rectifier and regulator according to some embodiments.

FIGS. 15-19

FIGS. 15 through 19 depict an exemplary implementation of a circuit according to various embodiments. The depictions may represent a possible implementation of circuit 4000, and illustrate exemplary parts and components for this possible implementation. It will be appreciated, however, that other component and parts selections are contemplated, according to various embodiments.

Figure 15:
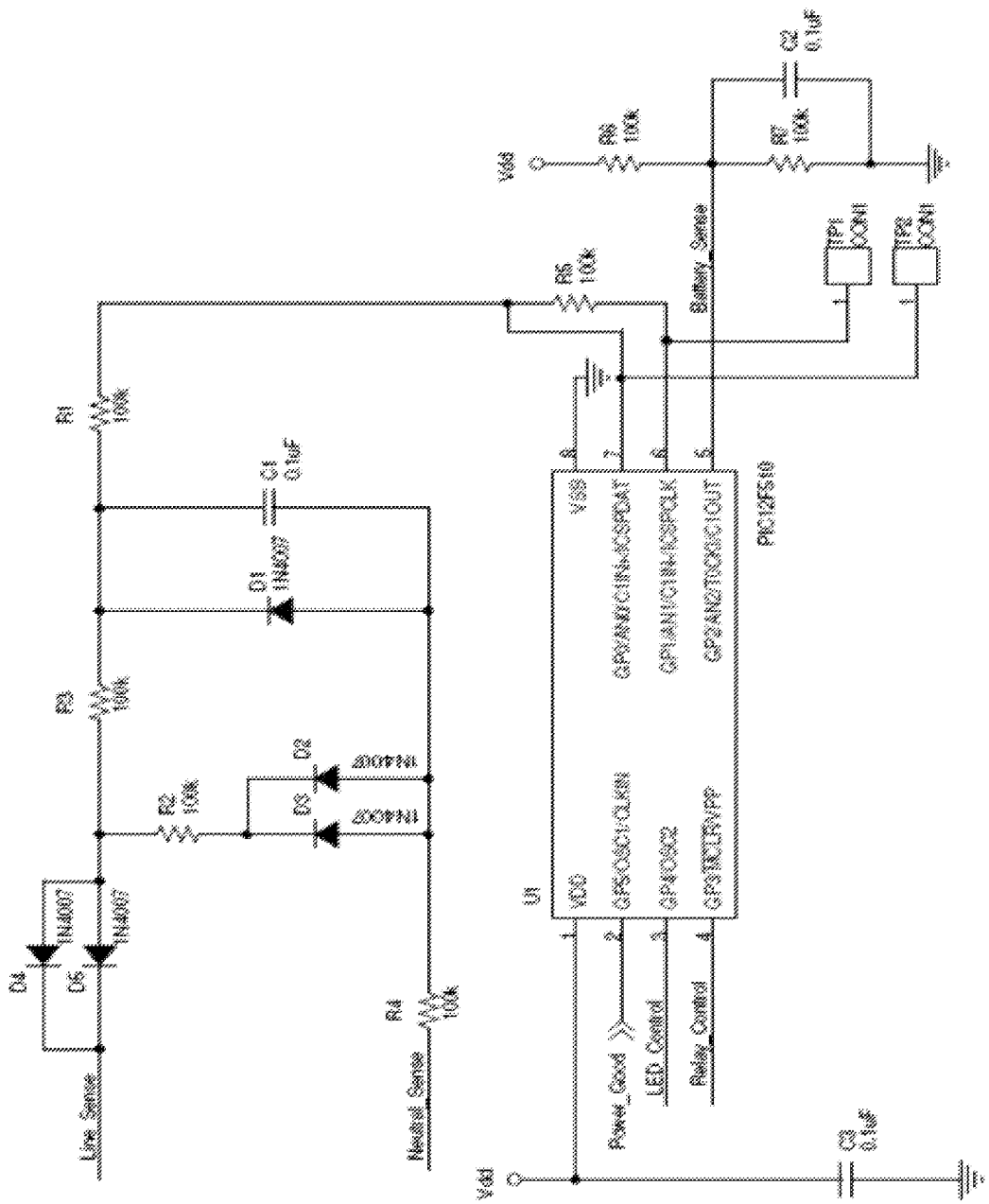
FIG. 15 illustrates a schematic for a microcontroller and for a switch sensor according to some embodiments.

FIG. 15 illustrates a schematic for a microcontroller and for a switch sensor according to some embodiments.

Figure 16:
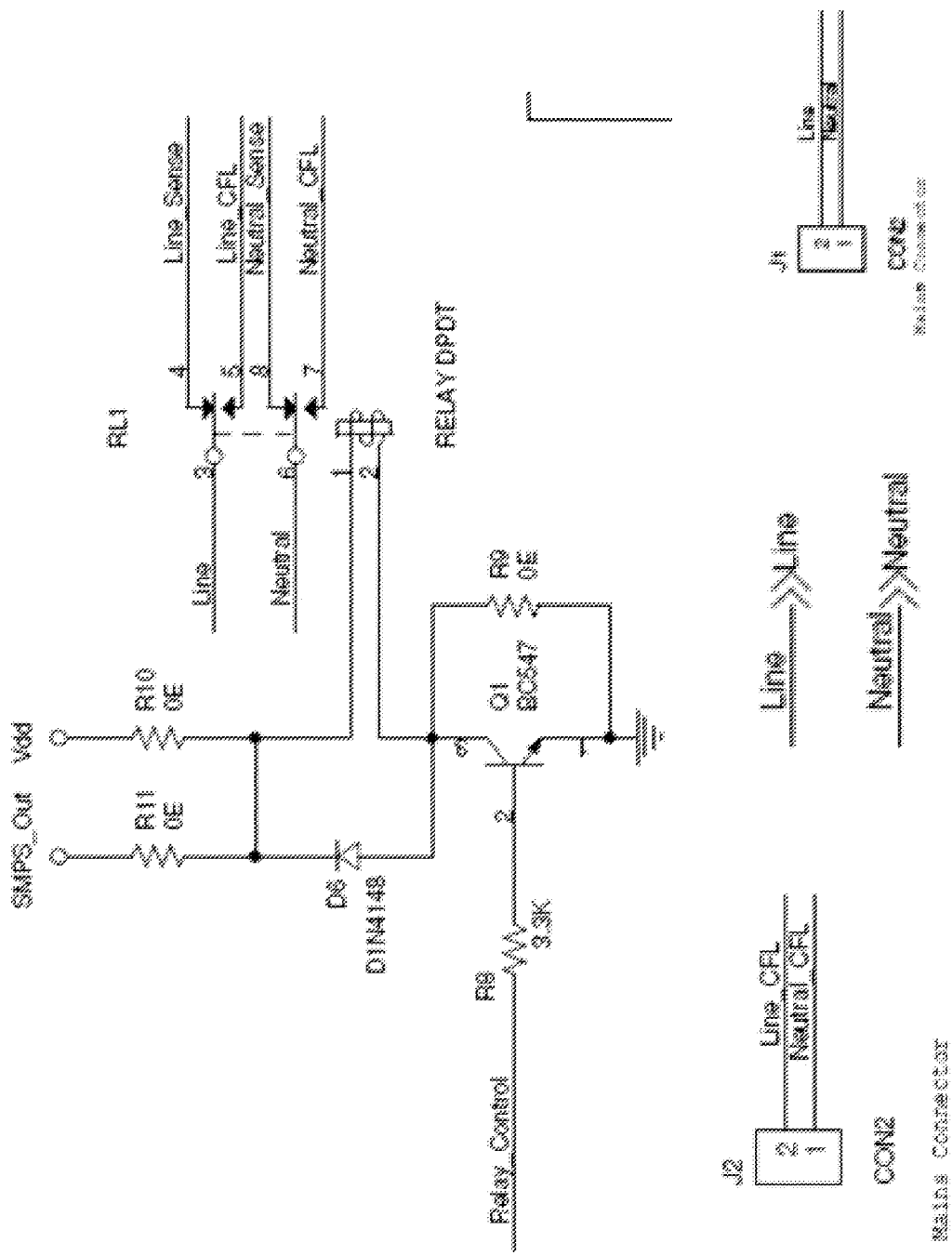
FIG. 16 illustrates a schematic for a relay control according to some embodiments.

FIG. 16 illustrates a schematic for a relay control according to some embodiments.

Figure 17:
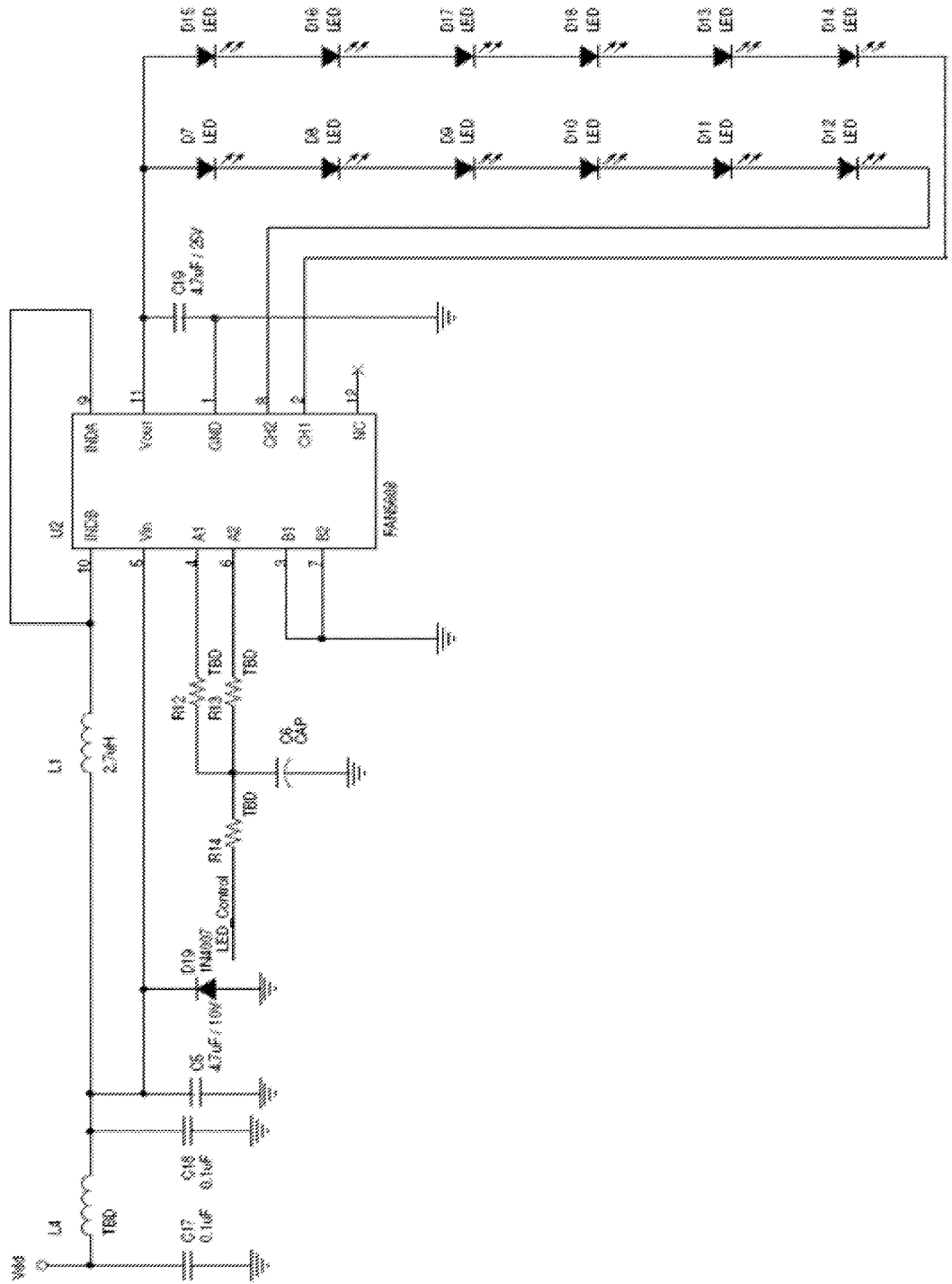
FIG. 17 illustrates a schematic for a LED and LED driver according to some embodiments.

FIG. 17 illustrates a schematic for a LED and LED driver according to some embodiments.

Figure 18:
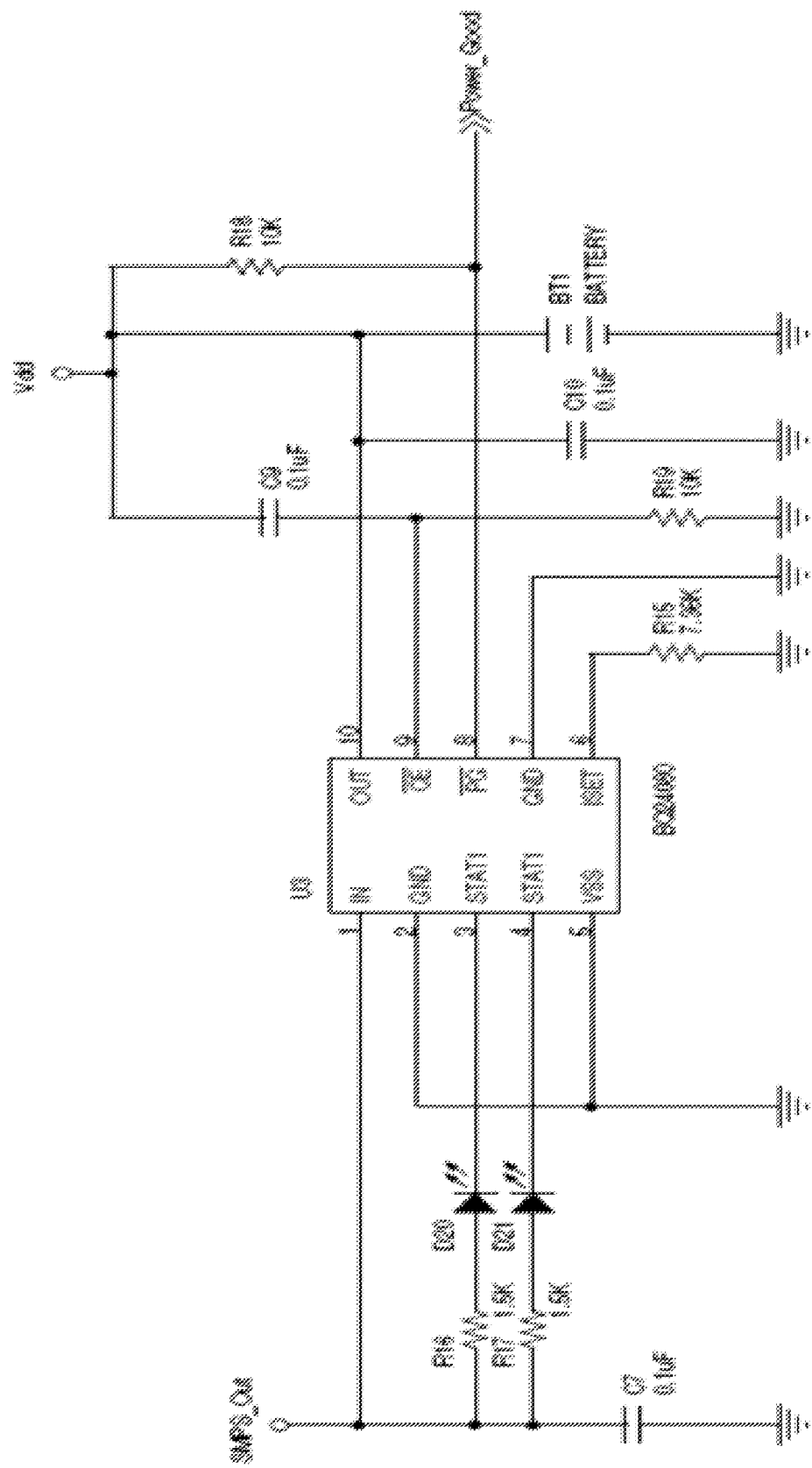
FIG. 18 illustrates a schematic for a charger and a battery according to some embodiments.

FIG. 18 illustrates a schematic for a charger and a battery according to some embodiments.

Figure 19:
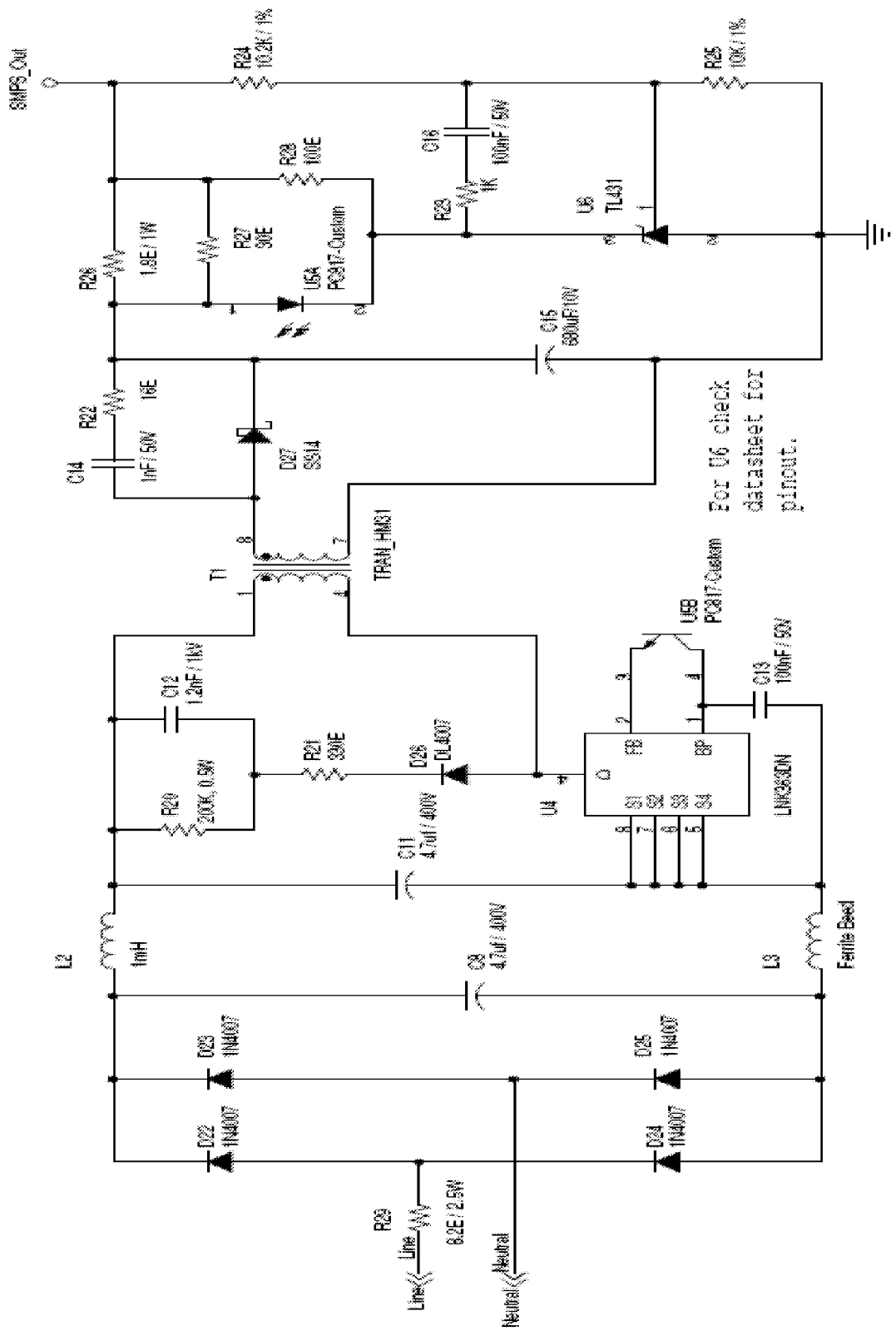
FIG. 19 illustrates a schematic for a switch mode power supply (SMPS) according to some embodiments.

FIG. 19 illustrates a schematic for a switch mode power supply (SMPS) according to some embodiments.

APPLICATIONS

Though various embodiments have been described herein with respect to light sources, it will be appreciated that other appliances and applications are likewise contemplated. A circuit 1000 or apparatus according to various embodiments may incorporate an insect deterrent, a mosquito repellant, a fan, or any other appliance or gadget. An apparatus according to various embodiments may be used in conjunction with fans, wi-fi routers, LAN switches, chargers adaptors, big power systems, pumps, motors, sewage pumps, generators, energy systems etc. An apparatus according to various embodiments may be used in some or in any situation where it is desirable to detect the state of a control switch even when a primary source of power is not available, including situations where an appliance can remain active by drawing on a secondary power source so long as the state of the control switch is "on" and the primary source of power is not available.

An apparatus according to various embodiments may be used for controlling appliances that are not directly connected to a switch (e.g., to switch 14). In some embodiments, a grid power sensor and a switch sensor may detect, respectively, the presence or absence of grid power, and the state of a switch on a circuit (e.g., on an external circuit). Based on what is detected by these sensors, a signal may be transmitted wirelessly to a gadget or appliance. For example, a signal may be transmitted via radio-frequency identification, or infrared based technologies.

According to various embodiments, circuit 1000 may take various forms or implementations. For example, circuit 1000 may be implemented as a silicon integrated circuit, as a series of standard electrical components, or as a combination thereof. It will be appreciated that various embodiments contemplate various physical implementations for circuit 1000.

An apparatus according to various embodiments may cause a light source (e.g., a secondary light source) to emit light in the event that (1) grid power is available and an external switch is "on"; (2) grid power is not available and an external switch is "on". In other instances, the apparatus may cause the light source not to emit light.

An apparatus according to various embodiments may cause a light source (e.g., a secondary light source) to emit light in the event that grid power is not available and an external switch is "on". In other instances, the apparatus may cause the light source not to emit light. For example, when grid power is available and the external switch is on, the apparatus may cause the light source not to emit light because the light source may be a secondary light source this will be allowed to conserve energy while a primary light source is operating and drawing power from grid power.

An electronic circuit according to some embodiments is capable of distinguishing between a loss of power due to the opening of a line switch and a loss of power resulting from a line failure when the line switch is either open or closed. According to various embodiments, the electronic circuit may make this distinction either with or without the addition of any external elements (passive or active) and without any modification of the existing wiring system. Such a circuit may be beneficial in that modifications to existing wiring systems may be dangerous, expensive, difficult, time-consuming, and/or illegal. By avoiding the necessity of making modifications to an existing wiring system (e.g., to an external circuit), an electronic circuit according to various embodiments may increase portability and reduce the amount of equipment required for implementation.

U.S. Pat. No. 4,323,820, entitled "Emergency lighting system" is hereby incorporated by reference herein for all purposes.

An apparatus according to various embodiments may be contained completely to one side of a switch. The apparatus may detect the state of the switch by using existing, external elements (e.g., appliances) to complete a circuit that includes the switch. An apparatus according to various embodiments need not include a separate or additional component on the other side of a switch in order to complete a circuit that includes the switch. For example, if a switch is operable to open or close an electrical connection across a live wire, an apparatus according to various embodiments need only be coupled with the live wire on one side of the switch, and not on the other side of the switch.

An apparatus according to various embodiments need not place a separate capacitor or any other element on the opposite side of the switch as the main or primary circuitry of the apparatus.

An apparatus according to various embodiments may be self contained. An apparatus according to various embodiments may be physically or mechanically interconnected, may be rigid, may be completely in the same housing or structure, or may otherwise constitute an unbroken whole. An apparatus according to various embodiments does not include two physically separate components. An apparatus according to various embodiments does not include and does not require a separate capacitor or any other separate element. An apparatus according to various embodiments does not include and does not require a separate capacitor or any other separate element that is connected to the existing wiring system. Accordingly, use of an apparatus according to various embodiments may necessitate no more than plugging in the apparatus, and need not require cumbersome or dangerous manual installation of additional elements (e.g., additional capacitors).

An apparatus according to various embodiments may sense, detect, or otherwise determine the state of an external circuit (e.g., of a home or building circuit) completely from within the apparatus itself. For example, the apparatus may determine the state of a switch or the presences or absence of power in the external circuit. An apparatus according to various embodiments does not rely upon an external sensor or detector for determining a state of the external circuit. An apparatus according to various embodiments does not rely upon an external sensor or detector for determining a presence of power or for determining the state of a switch in an external circuit.

An apparatus according to various embodiments may function by virtue of the presence of external loads. An apparatus according to various embodiments may function by virtue of the presence of external appliances (e.g., appliances on an external circuit). An apparatus according to various embodiments may be operable to function in the presence of a wide range of external loads. An apparatus according to various embodiments may be operable to function in the presence of a wide range of external loads, which may include, for example, loads with resistive, capacitive, and/or inductive characteristics.

Accordingly, an apparatus according to various embodiments may avoid the need to detect a reference load (e.g., a capacitor), thereby avoiding situations where the reference load may be disguised or hidden by certain counteracting external loads. For instance, an apparatus according to various embodiments may avoid the need to detect a reference capacitor whose presence may by hidden by loads that have resistive, inductive and/or both characteristics. An apparatus according to various embodiments may be capable of detecting external loads with any combination of capacitive, inductive, or resistive characteristics.

An apparatus according to various embodiments, by avoiding reliance on reference or external element (e.g., a capacitor placed on the far side of a switch), may also avoid reliance on the protection afforded by such an element. An apparatus according to various embodiments may send out a reference or sensing signal into the external circuit while minimizing or eliminating the risk of damage to the external circuit and/or to one or more external loads (e.g., appliances). An apparatus according to various embodiments need not rely on an additional external element to channel or otherwise mitigate this reference signal so as to avoid harming the external circuit or external appliances.

An apparatus according to various embodiments may generate signals that avoid Electro Magnetic Interference (EMI) and Electro Magnetic Compatibility (EMC) interference (e.g., EMI & EMC interference with other devices on the external circuit).

An apparatus according to various embodiments may generate a reference or sensing signal to send to the external circuit for detecting the state of a switch in the external circuit. In various embodiments, this signal need not be high frequency, nor need it be high voltage. According to various embodiments, this may allow for power savings, for the transmission of less harmful signals, and/or for the use of cheaper equipment.

An apparatus according to various embodiments may function with both single phase and three phase supply. An apparatus according to various embodiments may thereby function where implementations involving a separate or external load capacitor may be less functional. For example, in single phase or three phase operation a load capacitor may have different inductive load from electricity boards transformer appearing in shunt if they are physically closed, which may negatively impact the operations of implementations that are dependent on the load capacitor.

An apparatus according to various embodiments may function using either an AC distribution system or a DC distribution system. An apparatus according to various embodiments is not confined to the use of an AC distribution system. An apparatus according to various embodiments may function via a stored charge (e.g., a battery) that delivers DC power to multiple devices.

An apparatus according to various embodiments may avoid the need for an external capacitor load for a switch sensing circuit connected next to an external switch. Accordingly, even where there might be two products using the same network, there need not be a requirement that each be individually paired with a capacitor. In other words, there need not be a requirement that each device be paired with a capacitor that bridges the live and neutral wires on the opposite side of the switch controlling the device. Thus, a need for adding an additional capacitor per device may be avoided.

An apparatus according to various embodiments may be used in with any appliance, not just with a light or lights. For example, a circuit according to various embodiments may activate a first audio system when primary power is present, but may activate a second audio system when primary power is lost.

Although various embodiments have been described herein, it will be appreciated that other embodiments and implementations are contemplated. Contemplated embodiments include any that fall within the spirit and scope of those described herein.

In various embodiments, an appliance may be contained in the same housing as other circuit components. For example, circuit 1000, including primary light source 4 may be contained within the same housing. In some embodiments, the appliance may be contained in a different housing from other circuit components. In some embodiments, the appliance may be contained in a different housing from other components of the apparatus. In some embodiments, either or both of the primary and secondary appliances may be either in the same housing as other components, or external to the housing of other components.

In various embodiments, a source of power or energy (e.g., a battery) may be contained either within the same housing as other circuit or apparatus components, or may be situated external to such housing.

An apparatus according to various embodiments may have as a power source (either primary, secondary, or both), various forms of energy. Such forms of energy may include battery, solar, or any other form.

An apparatus according to various embodiments, may poll the state of a control switch (e.g., switch 14). The apparatus may take any manner of action based on the state or orientation of the control switch. For example, the apparatus need not merely activate or inactivate a light based on a state of the control switch. In some embodiments, the apparatus, may inactivate a light for a current power outage, but reactivate the light for a future power outage. The apparatus may do this based on a sequence of state changes detected in the switch, for example.

An apparatus according to various embodiments may function or operate even in the event of power outage or other loss of power from a primary power source (e.g., from grid power). An apparatus according to various embodiments may operate using a secondary power source when a primary power source is unavailable. An apparatus according to various embodiments may use a secondary appliance (e.g., an LED) in place of a primary appliance (e.g., an incandescent light) when power is unavailable from a primary power source. An apparatus according to various embodiments may activate an appliance (e.g., a light) or maintain the appliance in an active state when a control switch (e.g., switch 14) is in an "on" state. However, in various embodiments, if the control switch is turned to an "off" state, then the apparatus may inactivate the appliance. Thus, for example, even during a power outage, an apparatus according to various embodiments may still be turned off by flipping a switch that controls the apparatus.

In various embodiments, it may be desirable to inactivate the appliance of an apparatus (e.g., to turn off the light of an apparatus) during a particular loss of primary power. For example, the apparatus may have served its purpose as an emergency light and allowed for people to clear a building, to find alternate light sources, etc. Thus, it may be desirable to turn the apparatus off even during the power outage so as to conserve the secondary source of power (e.g., a battery) within the apparatus. Additionally, in various embodiments, it may be desirable to ready the apparatus for the restoration of primary power, during which time it may be desirable for the apparatus to be active (e.g., to emit light). Additionally, in various embodiments, it may be desirable to ready the apparatus for a future loss of primary power (e.g., a future power outage), during which time it may be desirable for the apparatus to be active. For example, during a future power outage, it may once again be necessary for the apparatus to be active until a building has been evacuated, alternative light sources have been procured, etc.

In various embodiments, it may be desirable to inactivate an apparatus during a current power outage, but to allow the apparatus to become active once power is restored. In various embodiments, it may be desirable to inactivate an apparatus during a current power outage, but to allow the apparatus to become active during a future power outage. In various embodiments, it may be desirable to inactivate an apparatus during a current power outage, but to allow the apparatus to become active again in the future, while not requiring future affirmative steps by a user. For example, it may be desirable to inactivate an apparatus in the present moment, while still configuring the apparatus to become active at a future moment, but without requiring further user input at the future moment.

An apparatus according to various embodiments is operable to carry out the following in response to a user command: (1) inactivate an appliance (e.g., a light source); (2) wait until the restoration of primary power; (3) upon the restoration of primary power activate the appliance.

An apparatus according to various embodiments is operable to carry out the following in response to a user command: (1) inactivate a first appliance (e.g., a secondary light source); (2) wait until the restoration of primary power; (3) upon the restoration of primary power activate a second appliance (e.g., a primary light source).

An apparatus according to various embodiments is operable to carry out the following in response to a user command: (1) inactivate an appliance (e.g., a light source); (2) wait until the restoration of primary power; (3) upon the restoration of primary power activate the appliance; (4) upon subsequent loss of primary power, activate the appliance.

An apparatus according to various embodiments is operable to carry out the following in response to a user command: (1) inactivate a first appliance (e.g., a secondary light source); (2) wait until the restoration of primary power; (3) upon the restoration of primary power activate a second appliance (e.g., a primary light source); (4) upon subsequent loss of primary power, activate the first appliance (e.g., the secondary light source).

An apparatus according to various embodiments is operable to carry out the following in response to a user command: (1) inactivate an appliance (e.g., a light source); (2) wait until the restoration of primary power and subsequent loss of primary power; (3) upon the subsequent loss of primary power activate the appliance.

An apparatus according to various embodiments is operable to carry out the following in response to a user command: (1) inactivate an appliance (e.g., a secondary light source); (2) wait until the restoration of primary power; (3) upon the restoration of primary power, return to a default state (e.g., to a state where a primary light source is active).

In various embodiments, a user command may be input or supplied in various ways. In various embodiments, a user command may be supplied via a control switch. The control switch may be a switch that is conventionally or ordinarily used to simply cause an appliance of the apparatus to become active or inactive (e.g., to cause a light to turn on or off). For example, the switch may be an ordinary light switch.

As will be appreciated, however, an input may be supplied via various other controls, or via various other means, whether or not such means had the ordinary function of controlling whether a light (or other appliance) is on or off.

In various embodiments, a user command may be input or supplied via a sequence of state changes made to a control switch (or other input device). For example, a user may supply a command by flipping a switch one or more times. For example, a user may supply a command by flipping a switch two or more times. In various embodiments, a user may supply a command based on the number of state changes made. For example, a first command may be supplied by flipping a switch twice in succession, while a second command may be supplied by flipping a switch three times in succession. In various embodiments, a user may supply a command by flipping a switch two or more times, and waiting some defined amount of time between each flipping of the switch. For example, an apparatus according to various embodiments may interpret a command based on the number of state changes and/or based on the amount of time lapsed between each state change. For example, in order to provide a command to an apparatus, a user may flip a switch once (e.g., from "on" to "off"), may then wait for two seconds, and may then flip the switch again (e.g., from "off" to "on"). The apparatus may interpret this sequence of state changes, together with the amount of time elapsed, as a particular command (e.g., as a command to inactivate a secondary appliance, but to re-activate the secondary appliance during a subsequent loss of primary power).

In various embodiments, a user may supply a command by flipping a switch (or otherwise toggling a control device), waiting for some predetermined range of time (e.g., from 2 to 4 seconds), and then flipping the switch again (or otherwise toggling the control device again). For example, the user may supply a command by flipping a switch, waiting two seconds, and then flipping it back.

An apparatus according to various embodiments may periodically, aperiodically, and/or continuously or substantially continuously poll the state of a control switch (or other control device). The apparatus may be operable to record or track the time of the state change. The apparatus may continue to poll the state of the control switch. The apparatus may record or track the time of a subsequent state change. The apparatus may track or record an elapsed time from one state change to the other.

An apparatus according to various embodiments may include a clock or other timer which may allow it to record the time of an event and/or to determine an elapsed time between events (e.g., between state changes of a switch). An apparatus according to various embodiments may include an electronic oscillator, a counter, or any other means of tracking the passage of time. An apparatus according to various embodiments may include logic or memory to allow it to record state changes, times, and/or elapsed times. In various embodiments, an apparatus includes electrical or mechanical processes that may implicitly track elapsed times. For example, filter circuitry may detect a user command that includes flipping a switch at some defined frequency that can be detected (or screened) by the filter. As will be appreciated, an apparatus according to various embodiments may include various ways for sensing, detecting, and interpreting user commands.

In various embodiments, microcontroller 11 may sense or detect user commands. In various embodiments, microcontroller 11 may track one or more variables used to interpret user commands. For example, microcontroller 11 may track times at which state changes occurred. In various embodiments, microcontroller 11 may send out instructions or commands to other components of circuit 1000 in order to act in accordance with received user commands. For example, based on a user command, microcontroller may inactivate a secondary light source.

An apparatus according to various embodiments may include logic and/or memory for detecting conditions referenced by a user command. For example, upon receiving a user command, circuit 1000 may repeatedly check for a restoration of primary power. Upon such restoration, circuit 1000 may change its state in accordance with the user command (e.g., revert to normal or default configuration).

In some embodiments more than one apparatus (e.g., circuit 1000) may used or connected in series. In some embodiments, a first and second apparatus are connected in series. The first apparatus is coupled or connected at one electrical contact to the live wire, and at the other electrical contact it is coupled or connected to the second apparatus. The second apparatus is coupled or connected at one electrical contact to the neutral wire, and at the other electrical contact it is coupled or connected to the first apparatus. In this way, for example, current may flow from live to neutral wire (or vice versa) in the process passing through both the first and second apparatus. For example, current may flow from the live wire to the first apparatus, then to the second apparatus, then to the neutral wire. In various embodiments, more than two apparatuses according to various embodiments may be connected in series. For example, current may flow from a live wire through three apparatuses and then to the neutral wire. As will be appreciated, apparatuses according to various embodiments may be connected in any network arrangement bridging or spanning live and neutral wires, including an arrangement that is a hybrid of series and parallel. For example, three apparatuses may be connected such that current flows from the live wire through the first apparatus, and then from the first apparatus through either of two parallel branches, the first branch including a second apparatus, and the second branch including a third apparatus. Current may flow from both the second and the third apparatuses to the neutral wire at their respective junctures with the neutral wire.

In various embodiments, two or more apparatuses (e.g., circuits 1000) may be controlled by a single switch. For instance, flipping the single switch may at once cause each to activate its respective appliance (e.g., light), or may at once cause each to inactivate its respective appliance. The switch may lie in series with the two or more apparatuses. Thus, in various embodiments, current flows between the live and neutral wires passing through the single switch and the two or more apparatuses.

In various embodiments, each of two or more apparatuses connected in series may be operable to sense the state of a single switch controlling the two or more apparatuses. A given apparatus may send a test signal, which may then pass through the switch, through one or more external appliances (e.g., appliances such as refrigerators, fans, TVs, etc.), through all the other apparatuses, and then return to the originating apparatus. If the originating apparatus receives the test signal upon its return, then it may be inferred that the state of the control switch is closed, or "on".

In various embodiments, it may be desirable for a given apparatus to distinguish the return of its own test signal from a signal that has been originated by another apparatus (e.g., by a neighboring apparatus). Otherwise, even in the presence of an "off" switch, an apparatus might receive a signal from another apparatus and conclude that its own test signal has passed through the entire circuit, and thus may mistakenly conclude that the switch is "on". Thus, in various embodiments, each of two or more apparatuses may be configured to send out test signals that are unique and/or distinguishable. In various embodiments, each of two or more apparatuses may be configured to send out test signals that are unique and/or distinguishable to a high probability (e.g., it is unlikely that signals originating from different apparatuses would be confused).

In some embodiments, an apparatus may be user-configurable upon manufacture, installation, or at any other point. The apparatus may be configured to send out a signal of a given form or type. For example, a small external dial on an apparatus may be turned to select a type of test signal that will be used by the apparatus. When a user is installing multiple apparatuses, the user may take care to set the dial differently for each apparatus installed in series, thus causing each to employ differing test signals. In some embodiments, an apparatus is configured upon manufacture and given a differentiating color, serial number, or other identifier. Upon installation, a user may then take care to use, for example, apparatuses of differing colors so as to ensure that apparatuses connected in series have unique test signals. As will be appreciated, many other ways are contemplated by which apparatuses can be configured to send out distinct signals.

In various embodiments, an apparatus may generate and/or select a signal at random. If each apparatus in series has generated a signal at random, then it may be unlikely that two will have generated the same signal. Accordingly, confusion may be avoided with high probability.

In various embodiments, signals transmitted by apparatuses may differ along one or more dimensions. Signals may differ by duration, frequency, start time, end time, by sequence of binary pulses, or according to any other dimension, as will be appreciated.

In various embodiments a circuit according to some embodiments may activate or deactivate a natural lighting system. For example, primary light source 4 may be sunlight. Thus, for example, a primary source of power may, when available, maintain a window, hatch, curtain, blinds, etc., in an open state to allow the entry of sunlight. When primary power is not available, the window, hatch, etc., may close. For instance, a hatch may close under its own weight. In some embodiments, even in the absence of power from the primary power source, the secondary power source may cause a window, blinds, etc., to open in order to allow entry of sunlight. In some embodiments, whether or not sunlight is allowed to enter is controlled by a control switch (e.g., switch 14). In various embodiments, whether or not primary power is present, the control switch may be used to allow or prevent the entry of sunlight. If primary power is not present, then the secondary power source may be used to e.g., open or close blinds, based on the state of the control switch.

An apparatus according to various embodiments may be operable to receive user inputs or instructions. The apparatus may include one or more sensors. The apparatus may include a light sensor, an acoustic sensor (e.g., a microphone), and/or any other sensor. The apparatus may be configured or operable to respond to certain inputs received via a sensor. For example, a clapping sound or other sudden or loud sound may be interpreted as a command. In some embodiments, shining a light (e.g., an infrared light, e.g., a remote control light) on an apparatus according to various embodiments may provide instructions to the apparatus. In various embodiments, a light, sound or other input may be interpreted by an apparatus as equivalent to changing the state of a control switch. For example, when a light source of an apparatus is not active, a clapping sound may cause the apparatus to activate the light source. On the other hand, if a light source of an apparatus is active, a clapping sound may cause the apparatus to inactivate the light source.

In various embodiments, an apparatus may be instructed to activate or deactivate an appliance (e.g., a light) solely via the use of a control switch. In various embodiments, the apparatus may sense the state of the control switch via attempting to transmit a signal through the circuit that includes the control switch. In various embodiments, an apparatus may activate or deactivate an appliance (e.g., a light) even without receiving audio or light signals.

In various embodiments, a primary light source and a primary power source may be one and the same. An apparatus according to various embodiments may include a solar panel, solar cell, or any other collector of solar energy. Solar energy may constitute the primary power source. In addition, solar energy may be used to charge or otherwise provide power to the secondary source of power (e.g., to a battery). In various embodiments, the primary light source need not be sunlight, but may instead be a light source (e.g., a strong or high-wattage light source). Power may still be collected from this light source. The power may be collected via a solar panel or solar cell, for example. The power collected from the primary light source may be used to power one or more circuit elements. The power collected from the primary light source may be used to power or charge the secondary source of power.

In some embodiments, an apparatus according to various embodiments need not be directly connected to a power grid or external electrical circuit. In various embodiments, an apparatus may be powered by a light source (e.g., by a light bulb) that is powered by a primary power source (e.g., by a power grid). When the apparatus senses that the light has gone off, the apparatus may infer that power in the grid has disappeared, and may therefore activate an internal light source (e.g., an LED). For this purpose, the apparatus may include a light sensor or other sensor for example.

The following are embodiments, not claims:

Embodiment Z. An apparatus comprising:
an electrical interface;
a signal source operable to output a reference signal to an external circuit via the electrical interface;
a first light source; and
a logic circuit operable to:
receive, via the electrical interface a first signal indicative of a response of the external circuit to the reference signal;
determine a second signal based on the first signal; and
transmit the second signal to the light source.

In various embodiments, whether a light source is on or off may depend only on a switch in an external circuit, and may be independent of whether there is grid power.

Embodiment C. An apparatus comprising:
an electrical interface;
a signal source operable to output a reference signal via the electrical interface;
a first light source; and
a logic circuit operable to:
  receive, via the electrical interface a first signal indicative of a response to the reference signal;
  determine a second signal based on the first signal; and
  transmit the second signal to the first light source.

Embodiment C.1. The apparatus of embodiment C in which the second signal is a signal instructing the first light source to emit light.

Embodiment C.2. The apparatus of embodiment C in which the second signal is a signal instructing the first light source not to emit light.

In various embodiments, a light source may be dependent both on the state of a switch and a power level in an external circuit.

Embodiment C.0. The apparatus of embodiment C further comprising a sensor operable to detect a power level in an external circuit coupled to the electrical interface, in which the logic circuit is further operable to:
  receive from the sensor a third signal indicative of a power level in the external circuit; and
  determine the second signal based on the first signal and the third signal.

In various embodiments, a light source may be instructed to go on if a switch is on and there is a lack of power in an external circuit.

Embodiment C.0.1. The apparatus of embodiment C.0 in which, in determining the second signal, the logic circuit is operable to:
  determine instructions for the first light source to emit light in the event that the first signal indicates that a switch in the external circuit is closed and the third signal indicates a lack of power in the external circuit.

In various embodiments, the response of an external circuit to a reference signal is an indicator of the state of a switch in the external circuit.

Embodiment C.3. The apparatus of embodiment C in which, in determining the second signal, the logic circuit is operable to:
  determine a state of a switch in an external circuit based on a comparison of the first signal to the reference signal; and
  determine a second signal instructing the first light source to emit light in the event that the state of the switch is on.

An apparatus according to various embodiments may include an entire home circuit. This home circuit may include one or more elements. The home circuit may include one or more elements that are appliances. The circuit may include one or more elements that are transformers. The circuit may, in various embodiments, be free of capacitors. The circuit may, in various embodiments, be free of elements that are non-appliances. The circuit may, in various embodiments, be free of elements placed in parallel to a light circuit according to various embodiments. The circuit may, in various embodiments, include several appliances in parallel.

Embodiment C.4. The apparatus of embodiment C further comprising an external circuit, in which the external circuit is coupled to the electrical interface, and in which all loads on the external circuit are appliances.

Embodiment C.4.x. The apparatus of embodiment C further comprising an external circuit, in which the external circuit is coupled to the electrical interface, and in which all loads on the external circuit are appliances or transformers.

Embodiment C.4.y. The apparatus of embodiment C further comprising an external circuit, in which the external circuit includes no capacitors placed in parallel to the apparatus.

Embodiment C.2. The apparatus of embodiment C further comprising a battery, in which the battery is coupled to the first light source and is operable to power the first light source in the event that the second signal matches a predetermined signal.

Embodiment C.2.1. The apparatus of embodiment C.2 further comprising a charger, in which the charger is coupled to the battery, and in which the charger is operable to charge the battery.

Embodiment C.2.1.1. The apparatus of embodiment C.2.1 further comprising a direct current regulator, in which the direct current regulator is coupled to the battery charger.

Embodiment C.2.1.1.1. The apparatus of embodiment C.2.1.1 further comprising a converter of alternating current to direct current, in which the converter is coupled to the regulator.

Embodiment C.2.1.1.1.1. The apparatus of embodiment C.2.1.1.1 further comprising a transformer, in which the transformer is coupled to the electrical interface and to the converter.

Embodiment C.2.1.1.1.1.1. The apparatus of embodiment C.2.1.1.1.1 further comprising:
  a sensor coupled to the electrical interface; and
  a relay,
  in which the sensor is operable to detect a power level in an external circuit coupled to the electrical interface,
  in which the logic circuit is further operable to:
    receive from the sensor a third signal indicative of a power level in the external circuit; and
    determine a fourth signal based on the first signal and the third signal, and in which the relay is operable to:
    receive the fourth signal from the logic circuit; and
    couple the electrical interface to the first light source and to the transformer in the event that the fourth signal corresponds to a predetermined value.

Various embodiments may include a sensor or other means for detecting power in a grid.

Embodiment C.2.1.1.1.1.1.1. The apparatus of embodiment C.2.1.1.1.1.1 in which the sensor comprises:
  a first electrical contact
  a second electrical contact
  a set of resistive elements to reduce the input voltage differential to the rest of the circuit;
  a full-wave rectifier to convert an alternating current into a direct current;
  a resistive element to step down the voltage of the direct current;
  a voltage divider with a third electrical contact at its center;
  a fourth electrical contact tied to ground,
  in which, as an indication of the power level in the external circuit, the sensor is operable to provide an output voltage reading across the third and fourth electrical contacts.

Embodiment C.00. The apparatus of embodiment C further comprising a second light source, in which the second light source is operable to draw power from an external circuit.

Embodiment C.9. The apparatus of embodiment C in which, in determining the second signal, the logic circuit is operable to:
measure the voltage across a component of the signal source;
determine a first value of the second signal if the measured voltage corresponds to
a first voltage; and
determine a second value of the second signal if the measured voltage corresponds to a second voltage.

Embodiment C.10. The apparatus of embodiment C in which, in determining the second signal, the logic circuit is operable to:
measure the voltage differential across a resistive element of the signal source;
determine a first value of the second signal if the measured voltage differential is zero; and
determine a second value of the second signal if the measured voltage differential is non-zero.

Embodiment C.11. The apparatus of embodiment C in which, in determining the second signal, the logic circuit is operable to:
measure the voltage differential across a resistive element of the signal source;
determine a first value of the second signal if the measured voltage differential is zero, in which the first value of the second signal is a value that instructs the light source to not emit light; and
determine a second value of the second signal if the measured voltage differential is non-zero, in which the second value of the second signal is a value that instructs the light source to emit light.

Embodiment C.8. The apparatus of C in which the signal source is circuit with a plurality of elements and nodes including:
a first electrical contact at a first node at which a reference voltage is received;
a second electrical contact at a second node at which a signal voltage is output;
a first resistive element spanning the first node and the second node;
a second resistive element spanning the second node and a third node;
a third resistive element spanning the third node and a fourth node;
a first set of diodes arranged in parallel spanning the fourth node and a fifth node, the first set of diodes permitting current flow from the fourth node to the fifth node;
a third electrical contact at the fifth node;
a fourth electrical contact at a sixth node;
a fourth resistive element spanning the sixth node and an eighth node, the eighth node being grounded;
a second set of diodes arranged in parallel spanning the eighth node and a seventh node, the second set of diodes permitting current flow from the eighth node to the seventh node;
a third set of diodes spanning the eighth node and the third node, the third set of diodes permitting current flow from the eighth node to the third node;
a capacitive element spanning the third node and the eighth node; and
a fifth resistive element spanning the fourth node and the seventh node.

Embodiment C.9. The apparatus of embodiment C in which the signal source is a circuit comprising:
a first electrical contact for receiving a reference voltage;
a second electrical contact;
a third electrical contact for interfacing with the line terminal of a grid network;
a fourth electrical contact for interfacing with the neutral terminal of the grid network;
in which the circuit, at low-frequency operation, functions as a voltage divider placing a resistive element in series with an external load connected between the third and fourth electrical contacts, and
in which the second electrical contact outputs a version of the reference voltage that is stepped down across the resistive element if current flows through the external load.

Embodiment C.9.1. The apparatus of embodiment C further comprising a plurality of diode elements operable to permit flow of current from the fourth electrical contact to the third electrical contact in the event of a voltage spike across the line and neutral terminals, but to prevent current flow from the third contact to the fourth contact.

Embodiment A. An apparatus consisting of:
a first electrical contact point;
a second electrical contact point;
a first light source;
a second light source;
a first sensor operable to detect a state of a power line;
a second sensor operable to detect a state of a switch;
a transformer;
a converter of alternating current to direct current, the converter coupled to the transformer;
a direct current regulator coupled to the converter;
a battery coupled to the direct current regulator;
a battery coupled to the battery charger and to the second light source;
a relay operable to:
receive a first signal;
couple the first and second electrical contact points to the first light source and to the transformer in the event that the first signal corresponds to a first value; and
couple the first and second electrical contact points to the second sensor in the event that the first signal corresponds to a second value; and
a logic circuit that is coupled to each of the relay, the second light source, the first sensor, the second sensor, and the battery, in which the logic circuit is operable to:
receive a first signal from the first sensor indicative of a state of the power line;
determine a second signal based on the first signal;
transmit the second signal to the relay;
receive a third signal from the second sensor indicative of a state of the switch;
determine a fourth signal based on the first signal and the third signal; and
transmit the fourth signal to the light source.

Embodiment A.0. The apparatus of embodiment A in which the first and second electrical contact points together constitute an interface to the power line.

Embodiment A.1. The apparatus of embodiment A in which the first light source is one of: (a) an incandescent bulb; (b) a compact fluorescent light; (c) a fluorescent light; and (d) a light emitting diode.

Embodiment A.2. The apparatus of embodiment A in which the second light source is a light emitting diode.

Embodiment A.3. The apparatus of embodiment A in which the second light source is a plurality of light emitting diodes.

Embodiment A.4. The apparatus of embodiment A in which the second light source is four light emitting diodes.

Embodiment A.5. The apparatus of embodiment A in which, in detecting the state of the switch, the second sensor is operable to send a pulse through the switch.

Embodiment A.6. The apparatus of embodiment A further comprising a mechanical interface to a light socket.

Embodiment A.7. The apparatus of embodiment A in which the state of the power line is a state with no power.

Embodiment A.8. The apparatus of embodiment A in which the state of the power line is a state with power.

Embodiment A.9. The apparatus of embodiment A in which the state of the switch is an open state.

Embodiment A.10. The apparatus of embodiment A in which the state of the switch is a closed state.

Embodiment D. An apparatus comprising:
a means to interface to an external circuit;
a means to store energy;
a means to reduce the voltage received from the external circuit;
a means to convert alternating current from the external circuit to direct current;
a means to replenish the store of energy with energy received from the external circuit;
a means to detect the absence of power in the external circuit;
a means to detect the state of a switch in the external circuit;
a secondary light source driven by the stored energy;
a means to activate the secondary light source only in the event that both an absence of power in the external circuit is detected and a closed state of the switch is detected.

Embodiment D.1. The apparatus of D further comprising:
a primary light source driven by power from the external circuit.

Embodiment D.2. The apparatus of D further comprising:
a means to couple the voltage reduction means to the external circuit only in the event that power is detected in the external circuit.

Embodiment E. A method comprising:
determining whether power is present in an external circuit;
determining the state of a switch in the external circuit;
activating a light source if and only if no power is present in the external circuit and the state of the switch is closed.

Embodiment E.1. The method of embodiment E in which determining the state of the switch comprises:
transmitting a reference pulse through the external circuit;
receiving a responsive pulse from the external circuit; and
determining the state of the switch based on the responsive pulse.

Embodiment G. A circuit comprising:
a live wire and a neutral wire channeling power from a power grid, the live wire and neutral wires connected only via at least one appliance and a secondary circuit, in which each of the at least one appliance and the secondary circuit are connected in parallel to one another across the live and neutral wires, and
in which the secondary circuit comprises:
a switch;
a bulb socket;
a first sensor for sensing the presence of power in the live and neutral wires;
a second sensor for sensing the state of the switch by transmitting a reference signal across the switch and across the at least one appliance and by measuring a resultant response signal;
a light bulb;
a secondary light source;
a battery; and
logic circuitry operable to:
receive from the first sensor a first input indicative of the presence of power in the live and neutral wires;
receive from the second sensor a second input indicative of the state of the switch;
cause the secondary light source to activate and to draw power from the battery only in the event that there is no power in the live and neutral wires and the switch is closed; and
cause the battery to recharge from power in the live and neutral wires only in the event that there is power in the live and neutral wires.

F. A method comprising:
detecting a first change in a state of a control device;
inactivating an appliance in response to the first change in state;
detecting a second change in a state of the control device;
determining an elapsed time between the first change and the second change; and
reactivating the appliance only if the elapsed time is greater than a predetermined time.

F.1 The method of embodiment F in which detecting a first change includes detecting that a switch has been turned off, and in which detecting a second change includes detecting that the switch has been turned on.

F.2 The method of embodiment F in which reactivating the appliance includes reactivating the appliance only if the elapsed time is greater than two seconds.

F.3 The method of embodiment F in which inactivating an appliance includes causing a light to turn off.

F.4 The method of embodiment F further comprising:
determining that an absent source of power has been restored;
determining, subsequent to the restoration, that the source of power has again disappeared; and
activating the appliance once the source of power has again disappeared.

The invention claimed is:
1. An apparatus comprising:
a means to interface to an external circuit;
a means to store energy;
a means to reduce the voltage received from the external circuit;
a means to convert alternating current from the external circuit to direct current;
a means to replenish the store of energy with energy received from the external circuit;
a means to detect the absence of power in the external circuit;
a means to detect the state of a switch in the external circuit, in which the means to detect the state of the switch comprises:
a means to randomly generate an outgoing signal, wherein the outgoing signal is imparted with a sufficiently random form that it would be distin- guishable from a signal of external origin, and would thereby be uniquely attributable to the apparatus;

a means to detect a first incoming signal; and a means to determine whether the first incoming signal matches the outgoing signal, a secondary light source driven by the stored energy;

a means to activate the secondary light source only in the event that both an absence of power in the external circuit is detected and a closed state of the switch is detected.

* * * * *